US007587048B2

(12) United States Patent
Moriyama

(10) Patent No.: US 7,587,048 B2
(45) Date of Patent: Sep. 8, 2009

(54) INFORMATION OUTPUT/RECORDING APPARATUS/METHOD FOR OUTPUTTING RECORDING INFORMATION TOGETHER WITH COPY CONTROL INFORMATION AND RECORDING THE INFORMATION THEREIN IN A HIGH SPEED DISTRIBUTION ENVIRONMENT

(75) Inventor: Yoshiaki Moriyama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 309 days.

(21) Appl. No.: 09/982,818

(22) Filed: Oct. 22, 2001

(65) Prior Publication Data

US 2002/0048366 A1    Apr. 25, 2002

(30) Foreign Application Priority Data

Oct. 20, 2000    (JP) .......................... P2000-320347

(51) Int. Cl.
*H04N 7/167* (2006.01)
(52) U.S. Cl. .................................. 380/201
(58) Field of Classification Search ............ 380/201
See application file for complete search history.

(56) References Cited

U.S. PATENT DOCUMENTS

| 5,418,853 | A | * | 5/1995 | Kanota et al. ............... 380/203 |
| 5,799,081 | A | * | 8/1998 | Kim et al. ................... 380/203 |
| 5,815,630 | A | | 9/1998 | Sato |
| 5,959,796 | A | | 9/1999 | Matsumi et al. |
| 6,111,990 | A | | 8/2000 | Sugaya et al. |
| 6,223,285 | B1 | * | 4/2001 | Komuro et al. ............. 713/160 |
| 6,275,588 | B1 | * | 8/2001 | Videcrantz et al. .......... 380/255 |
| 6,310,956 | B1 | * | 10/2001 | Morito et al. ............... 380/201 |
| 6,453,304 | B1 | * | 9/2002 | Manabu et al. .............. 705/57 |
| 6,470,138 | B1 | * | 10/2002 | Um et al. .................... 386/94 |
| 6,530,023 | B1 | * | 3/2003 | Nissl et al. ................. 713/200 |
| 6,539,468 | B1 | * | 3/2003 | Inoue et al. ................. 712/36 |
| 7,251,327 | B1 | * | 7/2007 | Sako et al. .................. 380/201 |

FOREIGN PATENT DOCUMENTS

| EP | 763936 A2 | * | 3/1997 |
| EP | 1 014 361 A2 | | 6/2000 |
| EP | 1 016 948 A1 | | 7/2000 |

(Continued)

OTHER PUBLICATIONS

RHJ Bloks, "The IEEE-1394 High Speed Serial Bus", Philips J. Res., vol. 50, No. 1/2 1996, pp. 209-216.

*Primary Examiner*—Emmanuel L Moise
*Assistant Examiner*—Nadia Khoshnoodi
(74) *Attorney, Agent, or Firm*—Sughrue Mion, PLLC

(57) ABSTRACT

The present invention is provided with: a distributing server for multiplexing copy control information and recording information, the copy control information indicating a number of times for restricting copying after recording, to be indicated after recording in a recording information apparatus is completed and when outputting the recording information and the copy control information; a transmitting unit for distributing the multiplexed recording information and copy control information to a recorder at an output speed higher than the reproducing speed of the recording information from the optical disk; a set top box for obtaining the distributed recording information and copy control information; and the recorder for recording the obtained recording information and copy control information into the optical disk, without modifying the copy control information.

25 Claims, 8 Drawing Sheets

FOREIGN PATENT DOCUMENTS

| | | |
|---|---|---|
| EP | 1 045 389 A1 | 10/2000 |
| EP | 1 071 091 A1 | 1/2001 |
| JP | 2000036949 A * | 2/2000 |
| JP | 2000-195159 A | 7/2000 |
| JP | 2000-195160 A | 7/2000 |
| JP | 2000-195162 A | 7/2000 |
| JP | 2000268496 A | 9/2000 |
| KR | 0166923 B1 | 4/1997 |

* cited by examiner

INFORMATION OUTPUT/RECORDING APPARATUS/METHOD FOR OUTPUTTING RECORDING INFORMATION TOGETHER WITH COPY CONTROL INFORMATION AND RECORDING THE INFORMATION THEREIN IN A HIGH SPEED DISTRIBUTION ENVIRONMENT

BACKGROUND OF THE INVENTION

1. Field of the Invention

The present invention relates to a technical field of an information output apparatus and an information output method, an information recording apparatus and an information recording method, an information output recording system and an information output recording method, and an information recording medium. More particularly it relates to the information output apparatus and the information output method for outputting recording information to be recorded into a recording medium such as audio information or video information, together with copy control information for restricting the number of copying after its recording, the information recording apparatus and the information recording method for recording the output recording information and copy control information into the recording medium, the information output recording system and the information output recording method including both the above information output apparatus and information recording apparatus, and an information recording medium with such an information output control program or information recording control program recorded there.

2. Description of the Related Art

Conventionally, receiving the audio information and the like, which is to be distributed through the Internet, by a personal computer (hereinafter, referred to as a PC simply) connected to the Internet and recording it in a recording medium such as a semiconductor memory and the like has been done.

Recently, as the development of image compression technique and high-density recording technique, it is becoming possible to record one piece of movie and the like distributed though the Internet, into a recording medium of large capacity, for example, a DVD (an optical disk having the capacity several times as large as that of the conventional CD (Compact Disc)).

In the above-mentioned distribution of the audio information and the like, how to protect a copyright on the audio information and the like is a problem. From this viewpoint, it is under study that the copy control information indicating that only one copy is permitted (namely, only copying the distributed audio information and the like into the recording medium is permitted) is distributed at the time distributing of the audio information and the like, together with the audio information and the like, the copy control information is recognized in the PC, and that the recording information received according to the above control information is recorded into the recording medium.

Further, in order to secure the copyright effectively, it is under study that the content of the distributed copy control information indicating that only one copy is permitted is rewritten to the content indicating that copying thereafter is prohibited, hence to be recorded into the recording medium at the time of recording the audio information and the like into the recording medium.

Recently, in addition to the audio information, movie information is going to be distributed. This movie information, however, has extravagant data, and there arises a demand for speedy distribution.

However, according to the above-mentioned conventional audio information distributing and recording system, it is necessary to recognize the copy control information and update it (overwrite it with new one or add new one to it) at the recording time thereof. Accordingly, if the same method is adopted to the case of movie information, the movie information and the like cannot be recorded into a recording medium at a high speed, which disturbs the speedy distribution.

If a priority is given to the speedy distribution, the copy control information cannot be recognized and updated (overwritten or added) at the time of recording it into a recording medium, which results in recording the copy control information as it was distributed. Accordingly, after the recording it into the recording medium, the recoding information can be copied into the recording medium at least once more, thereby failing in the protection of the copyright.

Further, if the speedy recognition and update of the copy control information is pursued, the cost of the information recording apparatus will be increased.

SUMMARY OF THE INVENTION

Considering the above problems, an object of the present invention is to provide an information output apparatus and an information output method capable of distributing the movie information and the like at a high speed while securing a copyright in a cost-reduction way, an information recording apparatus and an information recording method for recording the distributed recording information and copy control information into the recording medium, an information output recording system and an information output recording method including both the above information output apparatus and information recording apparatus, and an information recording medium with the same information output control program or information recording control program recorded there.

The above object of the present invention can be achieved by an information output apparatus of the present invention for outputting recording information as well as copy control information to an information recording apparatus for recording the recording information and copy control information into a recording medium, said copy control information indicating the number of times the recording information can be recorded. The information output apparatus is provided with: a multiplexing device for multiplexing the copy control information and the recording information, said copy control information indicating said number of times to be indicated after said recording in the recording information apparatus is completed; and an output device for outputting the multiplexed recording information and copy control information to the information recording apparatus at an output speed higher than a reproducing speed of the recording information from the recording medium.

According to the information output apparatus of the present invention, since the recording information and the copy control information indicating said number of times to be indicated after said recording in the recording information apparatus is completed are output at the output speed higher than the reproducing speed of the recording information, the output recording information and copy control information can be directly recorded into the recording medium, which enables the high speed output and recording of the recording information. Therefore, it is possible to speed up the recording processing of the recording information and copy control information into the recording medium while saving the cost and securing a copyright on the recording information by the copy control information.

In one aspect of the information output apparatus of the present invention, the information recording apparatus records the output recording information and copy control information into the recording medium, without modifying the copy control information.

According to this aspect, since the copy control information and the recording information output at a high speed can be recorded into the recording medium without modifying the copy control information, it is possible to output and record the recording information at a high speed.

In another aspect of the information output apparatus of the present invention, the copy control information indicates that further recording is prohibited after said recording in the information recording apparatus is completed.

According to this aspect, it is possible to output and record the recording information at a high speed in a copy-prohibiting state from the recording medium after the recording information is recorded.

In further aspect of the information output apparatus of the present invention, the output device outputs the multiplexed recording information and copy control information to the information recording apparatus through an electric communication line.

According to this aspect, it is possible to output the recording information and copy control information assuredly at a high speed.

In further aspect of the information output apparatus of the present invention, the electric communication line is at least any one of the Internet line, a ground wave digital line, a satellite communication line, and a cable television line.

According to this aspect, it is possible to output the copy control information and the recording information to a plurality of information recording apparatus assuredly at a high speed.

In further aspect of the information output apparatus of the present invention, the output device further comprises a converting device for converting the multiplexed recording information and copy control information into a recording information and copy control information in conformity with a recording format used for recording the information into the recording medium in the information recording apparatus, to output the converted information to the information recording apparatus, when outputting the multiplexed recording information and copy control information to the information recording apparatus at the output speed.

According to this aspect, the information recording apparatus can record the recording information and copy control information output at a high speed, as they are, at a high speed, and the other information reproducing device in conformity with the recording format can play back the recording medium with the recording information and the like recorded there.

The above object of the present invention can be achieved by an information recording apparatus of the present invention for recording copy control information and recording information into a recording medium, said copy control information and recording information output from an information output apparatus for outputting the recording information as well as the copy control information indicating the number of times the recording information can be recorded, to the information recording apparatus, The information output apparatus is provided with: a multiplexing device for multiplexing the copy control information and the recording information, said copy control information indicating said number of times to be indicated after said recording in the recording information apparatus is completed; and an output device for outputting the multiplexed recording information and copy control information to the information recording apparatus at an output speed higher than a reproducing speed of the recording information from the recording medium. The information recording apparatus is provided with: an obtaining device for obtaining the output recording information and copy control information; and a recording device for recording the obtained recording information and copy control information into the recording medium, without modifying the copy control information.

According to the information recording apparatus of the present invention, since the copy control information and the recording information output at a high speed can be recorded into the recording medium without modifying the copy control information, it is possible to output and record the recording information at a high speed. Therefore, it is possible to speed up the recording processing of the recording information and copy control information into the recording medium while saving the cost and securing a copyright on the recording information by the copy control information.

In one aspect of the information recording apparatus of the present invention, the recording device records the recording information and copy control information in conformity with the recording format into the recording medium, without modifying the content of the copy control information, when the recoding information and copy control information is output at the output speed.

According to this aspect, it is possible to record the recording information and copy control information output at a high speed, as they are, at a high speed, and reproduce the recording medium with the recording information and the like recorded there, in the other information reproducing apparatus in conformity with the recording format.

The above object of the present invention can be achieved by an information output recording system including an information output apparatus for outputting recording information as well as copy control information indicating the number of times the recording information can be recorded, and an information recording apparatus. The information output apparatus is provided with: a multiplexing device for multiplexing the copy control information and the recording information, said copy control information indicating said number of times to be indicated after said recording in the recording information apparatus is completed; and an output device for outputting the multiplexed recording information and copy control information to the information recording apparatus at an output speed higher than a reproducing speed of the recording information from the recording medium. The information recording apparatus is provided with: an obtaining device for obtaining the output recording information and copy control information; and a recording device for recording the obtained recording information and copy control information into the recording medium, without modifying the copy control information.

According to the information output recording system of the present invention, since the recording information and the copy control information indicating said number of times to be indicated after said recording in the recording information apparatus is completed are output at the output speed higher than the reproducing speed of the recording information and both the above information output at the high speed can be recorded into the recording medium without modifying the copy control information, it is possible to output and record the recording information at a high speed. Therefore, it is possible to speed up the recording processing of the recording information and copy control information into the recording medium while saving the cost and securing a copyright on the recording information by the copy control information.

The above object of the present invention can be achieved by an information output recording system of the present invention including an information output apparatus for outputting recording information as well as copy control information indicating the number of times the recording information can be recorded, and an information recording apparatus. The information output apparatus is provided with: a multiplexing device for multiplexing the copy control information and the recording information, said copy control information indicating said number of times to be indicated after said recording in the recording information apparatus is completed; and an output device for outputting the multiplexed recording information and copy control information to an obtaining device at an output speed higher than a reproducing speed of the recording information from the recording medium. The information recording apparatus is provided with: the obtaining device for obtaining the output recording information and copy control information to output the same to the information recording apparatus; and a recording device for recording the output recording information and copy control information into the recording medium, without modifying the copy control information.

According to the system of the present invention, the recording information and the copy control information indicating said number of times to be indicated after said recording in the recording information apparatus is completed are output at the output speed higher than the reproducing speed of the recording information through the obtaining device. Then, both the above information output at the high speed can be recorded into the recording medium without modifying the copy control information. Therefore, it is possible to output and record the recording information at a high speed. As a result, it is possible to speed up the recording processing of the recording information and copy control information into the recording medium while saving the cost and securing a copyright on the recording information by the copy control information.

In one aspect of the system of the present invention, said information recording apparatus is provided with: a recognizing device for mutually recognizing the type of the devices between the obtaining device and the information recording apparatus; and a recording control device for controlling the recording device so as to record the recording information and copy control information into the recording medium, only when recognizing that the recording information and copy control information has been output at the higher output speed from the obtaining device, based on the recognition result in the recognizing device.

According to the system of the present invention, since the recording information and copy control information are recorded into the recording medium only when the system recognizes that the above information has been output from the obtaining device at a high speed, it is possible to prevent from recording the recording information and the like output from an illegal obtaining device or information reproducing apparatus into the recording medium at a high speed.

In another aspect of the system of the present invention, the obtaining device outputs the obtained recording information and copy control information to the information recording apparatus at the output speed, after performing encryption processing corresponding to only the output speed.

According to this aspect, when outputting the recording information and copy control information are output to the information recording apparatus at the output speed, the system according to the present invention outputs both the above information after performing the encryption processing corresponding to only the output speed thereof, thereby outputting the recording information and copy control information with adequate security.

In further aspect of the system of the present invention, said information recording apparatus is provided with: a determination device for determining whether or not the recording information and copy control information has been output from the obtaining device, according to the encryption processing in the output recording information and copy control information, and a recording control device for controlling the recording device so as to record the recording information and copy control information into the recording medium, only when it proves that the recording information and copy control information has been output from the obtaining device at the higher speed, according to the determination result in the determination device.

According to this aspect, since the recording information and copy control information are recorded into the recording medium only when it proves that the recording information and copy control information have been output from the obtaining device at a high speed, the system according to the present invention can prevent from recording the recording information and the like output from an illegal obtaining device or information reproducing apparatus into the recording medium at a high speed.

In further aspect of the system of the present invention, said information recording apparatus is farther provided with: a decoding device for decoding the output recording information and copy control information; and a recording encryption device for recording the decoded recording information and copy control information into the recording medium, after performing the predetermined encryption processing for recording on the information.

According to this aspect, since the system according to the present invention records the decoded recording information and copy control information into the recording medium after performing the predetermined encryption processing for recording thereon, it can output the recording information and copy control information with more adequate security.

In further aspect of the system of the present invention, the copy control information indicates that further recording is prohibited after said recording in the information recording apparatus is completed.

According to this aspect, it is possible to output and record the recording information at a high speed in a copy-prohibiting state from the recording medium after the recording information is recorded.

In further aspect of the system of the present invention, the output device outputs the multiplexed recording information and copy control information to the obtaining device through an electric communication line.

According to this aspect, it is possible to output and record the recording information and copy control information assuredly at a high speed.

In further aspect of the system of the present invention, the electric communication line is at least any one of the Internet line, a ground wave digital line, a satellite communication line, and a cable television line.

According to this aspect, it is possible to output the recording information and copy control information to a plurality of information recording apparatus and also record the above assuredly at a high speed.

The above object of the present invention can be achieved by an information output method of the present invention for outputting recording information as well as copy control information to an information recording apparatus for recording the recording information and copy control information into a recording medium, said copy control information indicating the number of times the recording information can be recorded. The method is provided with: a multiplexing process for multiplexing the copy control information and the recording information, said copy control information indicating said number of times to be indicated after said recording in the recording information apparatus is completed; and an output process for outputting the multiplexed recording information and copy control information to the information recording apparatus at an output speed higher than a reproducing speed of the recording information from the recording medium.

According to the information output method of the present invention, since the recording information and the copy control information indicating said number of times to be indicated after said recording in the recording information apparatus is completed are output at the output speed higher than the reproducing speed of the recording information, the output recording information and copy control information can be recorded into the recording medium, without modifying the copy control information, which enables the high speed output and recording of the recording information. Therefore, it is possible to speed up the recording processing of the recording information and copy control information into the recording medium while saving the cost and securing a copyright on the recording information by the copy control information.

In one aspect of the information output method, the information recording apparatus records the output recording information and copy control information into the recording medium, without modifying the copy control information.

According to this aspect, since the copy control information and the recording information output at a high speed can be recorded into the recording medium without modifying the copy control information, it is possible to output and record the recording information at a high speed.

In another aspect of the information output method, the copy control information indicates that further recording is prohibited after said recording in the information recording apparatus is completed.

According to this aspect, it is possible to output and record the recording information at a high speed in a copy-prohibiting state from the recording medium after the recording information is recorded.

In further aspect of the information output method, in the output process, the multiplexed recording information and copy control information is output to the information recording apparatus through an electric communication line.

According to this aspect, it is possible to output the recording information and copy control information assuredly at a high speed.

In further aspect of the information output method, in the output process, the electric communication line is at least any one of the Internet line, a ground wave digital line, a satellite communication line, and a cable television line.

According to this aspect, it is possible to output the copy control information and the recording information to a plurality of information recording apparatus assuredly at a high speed.

In further aspect of the information output method, in the output process, the output process further comprises a converting process for converting the multiplexed recording information and copy control information into a recording information and copy control information in conformity with a recording format used for recording the information into the recording medium in the information recording apparatus, to output the converted information to the information recording apparatus, when outputting the multiplexed recording information and copy control information to the information recording apparatus at the output speed.

According to this aspect, the information recording method can record the recording information and copy control information output at a high speed, as they are, at a high speed, and according to the other information reproducing device in conformity with the recording format, it is possible to reproduce the recording medium with the recording information and the like recorded there.

The above object of the present invention can be achieved by an information recording method of the present invention for recording copy control information and recording information in a recording medium, said copy control information and recording information output by the information output method for outputting the recording information as well as the copy control information indicating the number of times the recording information can be recorded, to the information recording apparatus for recording the recording information and copy control information into the recording medium. The information output method is provided with: a multiplexing process for multiplexing the copy control information and the recording information, said copy control information indicating said number of times to be indicated after said recording in the recording information apparatus is completed; and an output process for outputting the multiplexed recording information and copy control information to the information recording apparatus at an output speed higher than a reproducing speed of the recording information from the recording medium. The information recording method is provided with: an obtaining process for obtaining the output recording information and copy control information; and a recording process for recording the obtained recording information and copy control information into the recording medium, without modifying the copy control information.

According to the information recording method of the present invention, since the copy control information and the recording information output at a high speed can be recorded into the recording medium without modifying the copy control information, it is possible to output and record the recording information at a high speed. Therefore, it is possible to speed up the recording processing of the recording information and copy control information into the recording medium while saving the cost and securing a copyright on the recording information by the copy control information.

In one aspect of the information recording method of the present invention, in the recording process, the recording information and copy control information conformable to the recording format is recorded into the recording medium, without modifying the copy control information, when the recoding information and copy control information has been output at the output speed.

According to this aspect, it is possible to record the recording information and copy control information output at a high speed, as they are, at a high speed, and according to the other information reproducing device conformable to the recording format, it is possible to play back the recording medium with the recording information and the like recorded there.

The above object of the present invention can be achieved by an information output recording method of the present invention including an information output method for outputting recording information as well as copy control information indicating the number of times the recording information can be recorded, and an information recording method. The information output method is provided with: a multiplexing process for multiplexing the copy control information and the recording information, said copy control information indicating said number of times to be indicated after said recording in the recording information apparatus is completed; and an output process for outputting the multiplexed recording information and copy control information at an output speed higher than a reproducing speed of the recording information from the recording medium. The information recording method is provided with: an obtaining process for obtaining the output recording information and copy control information; and a recording process for recording the obtained recording information and copy control information into the recording medium, without modifying the copy control information.

According to the information output recording method of the present invention, since the recording information and the copy control information indicating said number of times to be indicated after said recording in the recording information apparatus is completed are output at the output speed higher than the reproducing speed of the recording information and both the above information output at the high speed can be recorded into the recording medium regardless of the content of the copy control information, it is possible to output and record the recording information at a high speed. Therefore, it is possible to speed up the recording processing of the recording information and copy control information into the recording medium while saving the cost and securing a copyright on the recording information by the copy control information.

The above object of the present invention can be achieved by an information output recording method of the present invention including an information output method for outputting recording information as well as copy control information indicating the number of times the recording information can be recorded, and an information recording method. The information output method is provided with: a multiplexing process for multiplexing the copy control information and the recording information, said copy control information indicating said number of times to be indicated after said recording in the recording information apparatus is completed; and an output process for outputting the multiplexed recording information and copy control information to an information recording apparatus at an output speed higher tan a reproducing speed of the recording information from the recording medium. The information recording method is provided with: an obtaining process for obtaining the output recording information and copy control information to output the same to the information recording apparatus; and a recording process for recording the output recording information and copy control information into the recording medium, without modifying the copy control information.

According to the information output recording method of the present invention, since the recording information and the copy control information indicating said number of times to be indicated after said recording in the recording information apparatus is completed are output at the output speed higher than the reproducing speed of the recording information through the obtaining device and both the above information output at the high speed can be recorded into the recording medium without modifying the copy control information, it is possible to output and record the recording information at a high speed. Therefore, it is possible to speed up the recording processing of the recording information and copy control information into the recording medium while saving the cost and securing a copyright on the recording information by the copy control information.

In one aspect of the information output recording method of the present invention, said information recording method is further provided with a recognizing process for mutually recognizing the type of the devices between an obtaining device for executing the obtaining method and the information recording apparatus, and in the recording process, the recording information and copy control information is recorded into the recording medium, only when it is recognized that the recording information and copy control information has been output at the higher output speed from the obtaining device, based on the recognition result in the recognizing process.

According to the information output recording method of the present invention, since the recording information and copy control information are recorded into the recording medium only when the system recognizes that the above information has been output from the obtaining apparatus at a high speed, it is possible to prevent from recording the recording information and the like output from an illegal obtaining apparatus or information reproducing device into the recording medium at a high speed.

In another aspect of the information output recording method of the present invention, in the obtaining process, the obtained recording information and copy control information is output to the information recording apparatus at the output speed, after performing encryption processing corresponding to only the output speed.

According to this aspect, when the recording information and copy control information are output to the information recording apparatus at the output speed, they are output after the encryption processing corresponding to only the output speed, thereby outputting the recording information and copy control information with adequate security.

In further aspect of the information output recording method of the present invention, said information recording method is provided with a determining process for determining whether or not the recording information and copy control information has been output from the obtaining device, according to the encryption processing in the output recording information and copy control information, and in the recording process, the recording information and copy control information is recorded into the recording medium, only when it proves that the recording information and copy control information has been output from the obtaining device at the higher speed, according to the decision result in the determining process.

According to this aspect, since the recording information and copy control information are recorded into the recording medium only when it proves that the above recording information and copy control formation have been output from the obtaining apparatus at a high speed, it is possible to prevent from recording the recording information and the like output from an illegal obtaining apparatus or information reproducing device into the recording medium at a high speed.

In further aspect of the information output recording method of the present invention, said information recording method is further provided with: a decoding process for decoding the output recording information and copy control information; and a recording encryption process for recording the decoded recording information and copy control information into the recording medium, after performing the predetermined encryption processing for recording on the information.

According to this aspect, since the decoded recording information and copy control information are recorded into the recording medium after the predetermined encryption processing for recording is performed thereon, it is possible to output the recording information and copy control information with more adequate security.

The above object of the present invention can be achieved by an information recording medium of the present invention in which an output control program recorded in a readable way by an output control computer included in an information output apparatus for outputting recording information as well as copy control information to an information recording apparatus for recording the recording information and copy control information into a recording medium, said copy control information indicating the number of times the recording information can be recorded. The output control program causes the output control computer to function as: a multiplexing device for multiplexing the copy control information and the recording information, said copy control information indicating said number of times to be indicated after said recording in the recording information apparatus is completed; and an output device for outputting the multiplexed recording information and copy control information to the information recording apparatus at an output speed higher than a reproducing speed of the recording information from the recording medium.

According to the information recording medium of the present invention, since the output control computer works so as to output the recording information and the copy control information indicating said number of times to be indicated after said recording in the recording information apparatus is completed at the output speed higher than the reproducing speed of the recording information, the copy control information and the output recording information can be recorded into the recording medium without modifying the copy control information, which enables the high speed output and recording of the recording information. Therefore, it is possible to speed up the recording processing of the recording information and copy control information into the recording medium while saving the cost and securing a copyright on the recording information by the copy control information.

In one aspect of the information recording medium of the present invention, the information recording apparatus records the output recording information and copy control information into the recording medium, without modifying the copy control information.

According to this aspect, since the copy control information and the recording information output at a high speed are recorded into the recording medium without modifying the copy control information, it is possible to output and record the recording information at a high speed.

In another aspect of the information recording medium of the present invention, the copy control information indicates that further recording is prohibited after said recording in the information recording apparatus is completed.

According to this aspect, it is possible to output and record the recording information at a high speed in a copy-prohibiting state from the recording medium after the recording information is recorded.

In further aspect of the information recording medium of the present invention, the output device outputs the multiplexed recording information and copy control information to the information recording apparatus through an electric communication line.

According to this aspect, it is possible to output the recording information and copy control information assuredly at a high speed.

In further aspect of the information recording medium of the present invention, the electric communication line is at least any one of the Internet line, a ground wave digital line, a satellite communication line, and a cable television line.

According to this aspect, it is possible to output the copy control information and the recording information to a plurality of information recording apparatus assuredly at a high speed.

In further aspect of the information recording medium of the present invention, the output control program causes the output control computer to further function as a converting device for converting the multiplexed recording information and copy control information into a recording information and copy control information in conformity with a recording format used for recording the information into the recording medium in the information recording apparatus, to output the converted information to the information recording apparatus, when outputting the multiplexed recording information and copy control information to the information recording apparatus at the output speed.

According to this aspect, the information recording apparatus can record the recording information and copy control information output at a high speed, as they are, at a high speed, and the other information reproducing device conformable to the recording format can reproduce the recording medium with the recording information and the like recorded there.

The above object of the present invention can be achieved by an information recording medium of the present invention in which a recording control program recorded in a readable by a recording control computer included in the information recording apparatus for recording copy control information and recording information into a recording is medium, said copy control information and recording information output from an information output apparatus for outputting the recording information as well as the copy control information indicating the number of times the recording information can be recorded, to the information recording apparatus. The information output apparatus is provided with: a multiplexing device for multiplex the copy control information and the recording information, said copy control information indicating said number of times to be indicated after said recording in the recording information apparatus is completed; and an output device for outputting the multiplexed recording information and copy control information to the information recording apparatus at an output speed higher than a reproducing speed of the recording information from the recording medium. The recording control program causes the output control computer to function as: an obtaining device for obtaining the output recording information and copy control information; and a recording device for recording the obtained recording information and copy control information into the recording medium, without modifying the copy control information.

According to the information recording medium of the present invention, since the recording control computer works so as to record the copy control information and the recording information output at a high speed into the recording medium without modifying the copy control information, it is possible to output and record the recording information at a high speed. Therefore, it is possible to speed up the recording processing of the recording information and copy control information into the recording medium while saving the cost and securing a copyright on the recording information by the copy control information.

In one aspect of the information recording medium of the present invention, the recording device records the recording information and copy control information conformable to the recording format into the recording medium, regardless of the content of the copy control information, when the recoding information and copy control information has been output at the output speed.

According to this aspect, it is possible to record the recording information and copy control information output at a high speed, as they are, at a high speed, and reproduce the recording medium with the recording information and the like recorded there, in the other information reproducing apparatus conformable to the recording format.

The above object of the present invention can be achieved by a computer data signal embodied in a carrier wave and representing a sequence of instructions of the present invention, which is executed by a output control computer included in an information output apparatus for outputting recording information as well as copy control information to an information recording apparatus for recording the recording information and copy control information into a recording medium, said copy control information indicating the number of times the recording information can be recorded. The instructions are provided with the steps of: multiplexing the copy control information and the recording information, said copy control information indicating said number of times to be indicated after said recording in the recording information apparatus is completed; and outputting the multiplexed recording information and copy control information to the information recording apparatus at an output speed higher than a reproducing speed of the recording information from the recording medium.

According to the computer data signal embodied in a carrier wave and representing a sequence of instructions of the present invention, since the output control computer works so as to output the recording information and the copy control information indicating said number of times to be indicated after said recording in the recording information apparatus is completed at the output speed higher than the reproducing speed of the recording information, the copy control information and the output recording information can be recorded into the recording medium without modifying the copy control information, which enables the high speed output and recording of the recording information. Therefore, it is possible to speed up the recording processing of the recording information and copy control information into the recording medium while saving the cost and securing a copyright on the recording information by the copy control information.

In one aspect of the computer data signal embodied in a carrier wave and representing a sequence of instructions of the present invention, the information recording apparatus records the output recording information and copy control information into the recording medium, without modifying the copy control information.

According to this aspect, since the copy control information and the recording information output at a high speed are recorded into the recording medium without modifying the copy control information, it is possible to output and record the recording information at a high speed.

In another aspect of the computer data signal embodied in a carrier wave and representing a sequence of instructions of the present invention, the copy control information indicates that further recording is prohibited after said recording in the information recording apparatus is completed.

According to this aspect, it is possible to output and record the recording information at a high speed in a copy-prohibiting state from the recording medium after the recording information is recorded.

In further aspect of the computer data signal embodied in a carrier wave and representing a sequence of instructions of the present invention, the output device outputs the multiplexed recording information and copy control information to the information recording apparatus through an electric communication line.

According to this aspect, it is possible to output the recording information and copy control information assuredly at a high speed.

In further aspect of the computer data signal embodied in a carrier wave and representing a sequence of instructions of the present invention, the electric communication line is at least any one of the Internet line, a ground wave digital line, a satellite communication line, and a cable television line.

According to this aspect, it is possible to output the copy control information and the recording information to a plurality of information recording apparatus assuredly at a high speed.

In further aspect of the computer data signal embodied in a carrier wave and representing a sequence of instructions of the present invention, said instructions is further provided the step of converting the multiplexed recording information and copy control information into a recording information and copy control information in conformity with a recording format used for recording the information into the recording medium in the information recording apparatus, to output the converted information to the information recording apparatus, when outputting the multiplexed recording information and copy control information to the information recording apparatus at the output speed.

According to this aspect, the information recording apparatus can record the recording information and copy control information output at a high speed, as they are, at a high speed, and the other information reproducing device conformable to the recording format can reproduce the recording medium with the recording information and the like recorded there.

The above object of the present invention can be achieved by a computer data signal embodied in a carrier wave and representing a sequence of instructions of the present invention, which is executed by a recording control computer included in the information recording apparatus for recording copy control information and recording information into a recording medium, said copy control information and recording information output from an information output apparatus for outputting the recording information as well as the copy control information indicating the number of times the recording information can be recorded, to the information recording apparatus. The information output apparatus is provided with: a multiplexing device for multiplexing the copy control information and the recording information, said copy control information indicating said number of times to be indicated after said recording in the recording information apparatus is completed; and an output device for outputting the multiplexed recording information and copy control information to the information recording apparatus at an output speed higher than a reproducing speed of the recording information from the recording medium. The instructions are provided with the steps of obtaining the output recording information and copy control information; and recording the obtained recording information and copy control information into the recording medium, without modifying the copy control information.

According to the computer data signal embodied in a carrier wave and representing a sequence of instructions of the present invention, since the recording control computer works so as to record the copy control information and the recording information output at a high speed into the recording medium without modifying the copy control information, it is possible to output and record the recording information at a high speed. Therefore, it is possible to speed up the recording processing of the recording information and copy control information into the recording medium while saving the cost and securing a copyright on the recording information by the copy control information.

In one aspect of the computer data signal embodied in a carrier wave and representing a sequence of instructions of the present invention, the step of recording records the recording information and copy control information conformable to the recording format into the recording medium, without modifying the copy control information, when the recoding information and copy control information has been output at the output speed.

According to this aspect, it is possible to record the recording information and copy control information output at a high speed, as they are, at a high speed, and reproduce the recording medium with the recording information and the like recorded there, in the other information reproducing apparatus conformable to the recording format.

DESCRIPTION OF THE PREFERRED EMBODIMENTS (I) Embodiment

Preferred embodiments of the present invention will be described with reference to the drawings.

The embodiment described below is in the case of adopting the present invention to a distributing and recording system for distributing the audio information or the video information (hereinafter, referred to as recording information simply) through a cable television line (hereinafter, referred to as CATV (Cable Television) line simply) and recording the distributed recording information into a DVD and the like as a recording medium.

The whole structure of the distributing and recording system according to the embodiment will be described with reference to FIG. 1.

Figure 1:
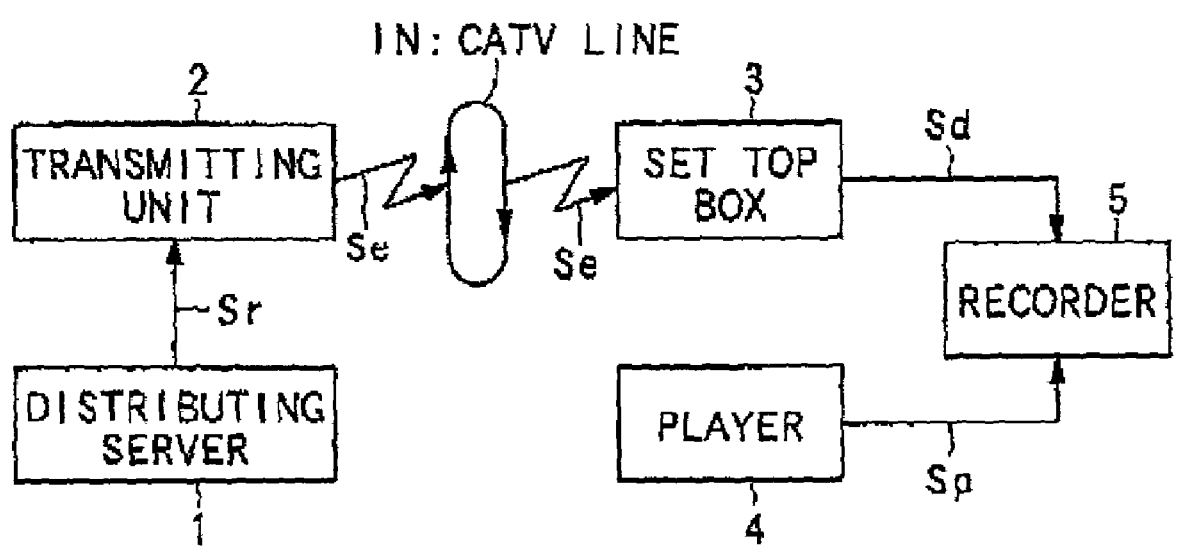
FIG. 1 is a block diagram showing the schematic structure of the distributing and recording system of a preferred embodiment of the present invention.

FIG. 1 is a block diagram showing the whole structure of the distributing and recording system according to the embodiment.

As illustrated in FIG. 1, the distributing and recording system according to the embodiment is provided with: a distributing server 1 as a multiplex device comprised of a hard disk device or a computer, for generating recording information to be distributed and outputting the same information as recording information Sr; a transmitting unit 2 as an output device and converting device for performing predetermined modulation processing, compression processing, and encryption processing on the recording information Sr and distributing the above to the CATV line IN as modulation information Se; a set top box 3 for obtaining the modulation information Se from the CATV line IN, performing predetermined demodulation processing and decoding processing on the obtained modulation information Se (respectively corresponding to the modulation processing and the encryption processing performed at a time of generating the modulation information Se), and outputting the above as demodulation information Sd; a DVD player 4 for reproducing the above recording information from a reproducing-only DVD and the like and outputting the above as reproducing information Sp; and a recorder 5 for recording the above recording information included in the demodulation information Sd or the reproducing information Sp into a recordable DVD.

The detailed distributing processing by the operation of the distributing server 1 and the transmitting unit 2 according to the embodiment will be described with reference to FIG. 2.

Figure 2:
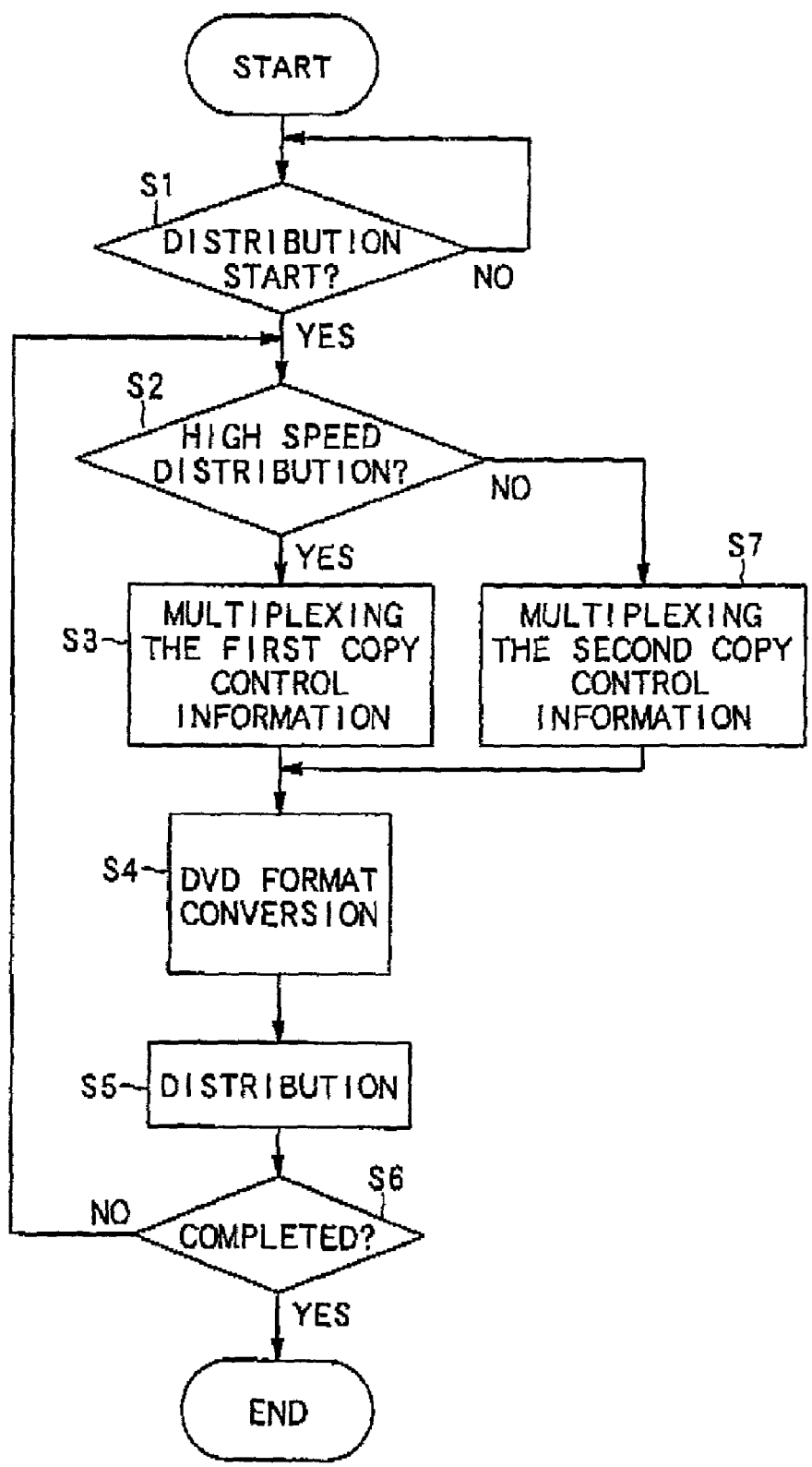
FIG. 2 is a flow chart showing the distributing processing of the embodiment.

FIG. 2 is a flow chart showing the above operation.

As illustrated in FIG. 2, in the distributing processing by the distributing server 1 and the transmitting unit 2, at first, it is determined whether or not the processing for starting the distribution of the recording information is performed by the distributing server 1 (Step S1). When it is not performed (NO; Step S1), the processing of Step S1 is repeated. When it is performed (YES; Step S1), it is determined whether or not an instruction of distributing the recording information at a higher distributing speed than the reproducing speed (more specifically, the reproducing speed when reproducing the recording information at a normal speed, by detecting the same information from the DVD after distributing it to the recorder 5, hence to be recorded in a recordable DVD as the demodulation information Sd) is issued by the distributing S server 1 (Step S2).

When the instruction for high-speed distribution is issued (YES; Step S2), first copy control information (namely, the first copy control information having the content to be recorded into the DVD after the recording into the DVD) for controlling the number of copying times after the recorder 5 records the recording information into the DVD is multiplexed to the recording information to be distributed to the CTAV line IN in the distributing server 1 (Step S3), to generate the recording information Sr.

Here, the multiplex of the first copy control information is performed by using a watermark (electronic watermark) technique while giving the concealable property to the first copy control information.

More specifically, the first copy control information here includes: copy-prohibited information (hereinafter, this copy-prohibited information is referred to as NMC (No More Copy) information) which is prohibited to be copied into the other recording medium, after being distributed from the distributing server 1 and being recorded (copied) into a DVD; and free copy-permitted information (hereinafter, the free copy-permitted information is referred to as CF (Copy Free) information) which can be copied into the other recording medium any times after being distributed and recorded.

After multiplexing of the first copy control information, the multiplexed recording information Sr is converted into DVD format that is the format for recording the information into the DVD (Step S4), further converted into the modulation signal Se in the transmitting unit 2 after the encryption, and delivered to the CATV line IN at a distribution speed corresponding to the high-speed distribution (Step S5).

Thereafter, it is determined whether or not multiplex of the first copy control information and the distribution thereafter have been completed as for all the recording information (Step S6). When they have been completed (YES; Step S6), the distributing processing is completed. When they have not been completed (NO; Step S6), this step is returned to Step S2 where the distributing processing is continued so as to complete a series of the above-mentioned distributing processing as for all the recording information.

In the above determination in Step S2, when the recording information Sr is distributed at an ordinary distributing speed similar to the reproducing speed, without performing high-speed distribution of the recording information (NO; Step S2), second copy control information is multiplexed to the recording information Sr in order to control the number of copying times in the distribution stage of the recording information Sr (Step S7), similarly to the conventional art, and thereafter, the processing of the above-mentioned Step S4 and Step S5 will be executed.

More specifically, the second copy control information includes: copy-prohibited information (hereinafter, the copy prohibited information is referred to as NC (Never Copy) information) which is only permitted to be distributed from the distributing server 1 and prohibited to be recorded into the recording medium such as the DVD; one copy-permitted information (the one copy-permitted information is updated to the above-mentioned copy-prohibited information (the above NMC information) at the recording it into the DVD as described later (refer to Step S20 of FIG. 6), and it is, hereinafter, referred to as CO (Copy Once) information) which is permitted to be recorded into the DVD only once after being distributed; and the above-mentioned free copy information CF.

The modification (update) of the copy control information can be performed, for example, by overwriting the one copy-permitted information with the above-mentioned copy-prohibited information as well as by adding the above-mentioned copy-prohibited information to the one copy-permitted information in order to record modifying history.

Therefore, at the high-speed distribution, the multiplex of the first copy control information indicating NMC can be performed by multiplexing only NMC to the recording information as well as by multiplexing the second copy control information indicating CO and NMC to the recording information. For example, if the second copy control information indicating CO is overwritten with NMC in the recorder 5 at the ordinary distributing speed distribution, only NMC is multiplexed to the recording information in the distributing server 1 at the high-speed distribution. However, if NMC is added to CO in the recorder 5 at the ordinary distributing speed distribution, CO and NMC are multiplexed to the recording information in the distributing server 1 at the high-speed distribution.

The detailed structure and operation of the set top box 3 will be described with reference to FIG. 3.

Figure 3:
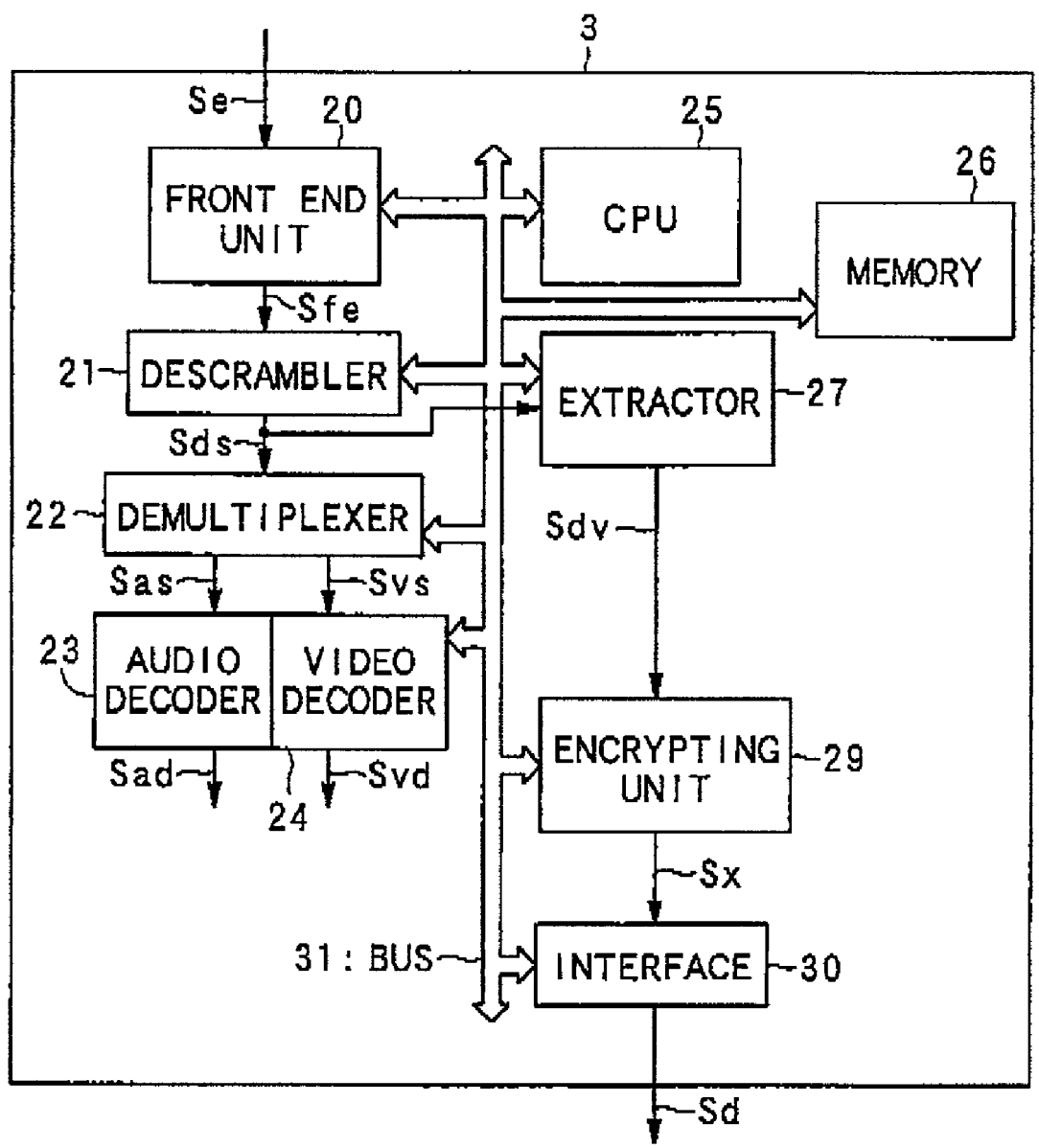
FIG. 3 is a block diagram showing the schematic structure of a set top box of the embodiment.

FIG. 3 is a block diagram showing the detailed structure of the set top box 3.

As illustrated in FIG. 3, the set top box 3 according to the embodiment is able to output the modulation information Se obtained from the CATV line IN to a television set and the like, not illustrated, as well as to output the demodulation information Sd to the recorder 5 as mentioned above. More concretely, it is comprised of a front end unit 20, a descrambler 21, a demultiplexer 22, a audio decoder 23, a video decoder 24, a CPU 25, a memory 26, an extractor 27, an encrypting unit 29, and an interface 30, and the respective components can transmit and receive the control information and the like to and from each other through a bus 31.

The operation of the set top box 3 will be described.

The operation in the case of outputting the modulation information Se input from the CATV line IN to the television set, not illustrated, in the set top box 3, will be described at first.

In this case, the audio information and the video information are output in a state of being compressed and encrypted, in the modulation information Se.

The front end unit performs predetermined receiving processing on the modulation information Se, generates a receive signal Sfe, and outputs it to the descrambler 21.

The descrambler 21 decodes the encryption of the recording information included in the receive signal Sfe, generates a decoding signal Sds, and outputs it to the demultiplexer 22.

Thus, the demultiplexer 22 separates the audio information and the video information included in the decoding signal Sds, outputs the separated audio information to the audio decoder 23 as an audio signal Sas, and outputs the separated video information to the video decoder 24 as a video signal Svs.

The audio decoder 23 decodes the sound signal Sas and outputs it to the television set, not illustrated, as an audio output signal Sad.

On the other hand, the video decoder 24 decodes the video signal Svs and similarly outputs it to the television set, not illustrated, as a video output signal Svd.

The CPU controls the above respective components collectively while transmitting and receiving the control information depending on the necessity through the bus 31. The information necessary for the above control is temporarily stored in the memory 26 through the bus 31, so to be used for the same control.

The operation in the case of outputting the recording information included in the modulation information Se obtained from the CATV line IN, to the recorder 5 as the demodulation information Sd will be described.

When the demodulation information Sd is output to the recorder 5, the modulation information Se is input to the set top box 3 at first, and the decoding signal Sds is generated by the operation of the front end unit and the descrambler 21 and output to the extractor 27.

Thus, the extractor 27 extracts only the recording information to be recorded into the DVD by the recorder 5, from the decoding signal Sds, generates an extraction signal Sdv, and outputs it to the encrypting unit 29.

The encrypting unit 29 encrypts the extraction signal Sdv according to the encryption processing varying depending on the distribution speed, by using an encryption key set in the interface 30 through the mutual authentication with the recorder 5 described later, generates an encryption signal Sx, and outputs it to the interface 30, Here, a method of the encryption processing in the encrypting unit 29 at the time of high-speed distribution is, hereinafter, referred to as "A" method, while a method of encryption processing in the encrypting unit 29 at the time of the ordinal distribution at an ordinal speed is, hereinafter, referred to as "C" method.

Though the encryption is performed by the "A" method at a high-speed distribution, regardless of the content of the first copy control information, the encryption is not performed in the case of the CF information or absence of the second copy control information at the ordinal distribution time.

The interface 30 performs predetermined interface processing on the encryption signal Sx, and outputs it to the recorder 5 as the demodulation information Sd.

The output speed at this time is the same as the input speed when the modulation signal Se is output to the set top box 3.

The CPU controls the above respective components collectively while transmitting and receiving the necessary control information through the bus 31. The information necessary for the above control is temporarily stored in the memory 26 through the bus 31, to be used for the above control.

The detailed structure and operation of the DVD player 4 will be described with reference to FIG. 4.

Figure 4:
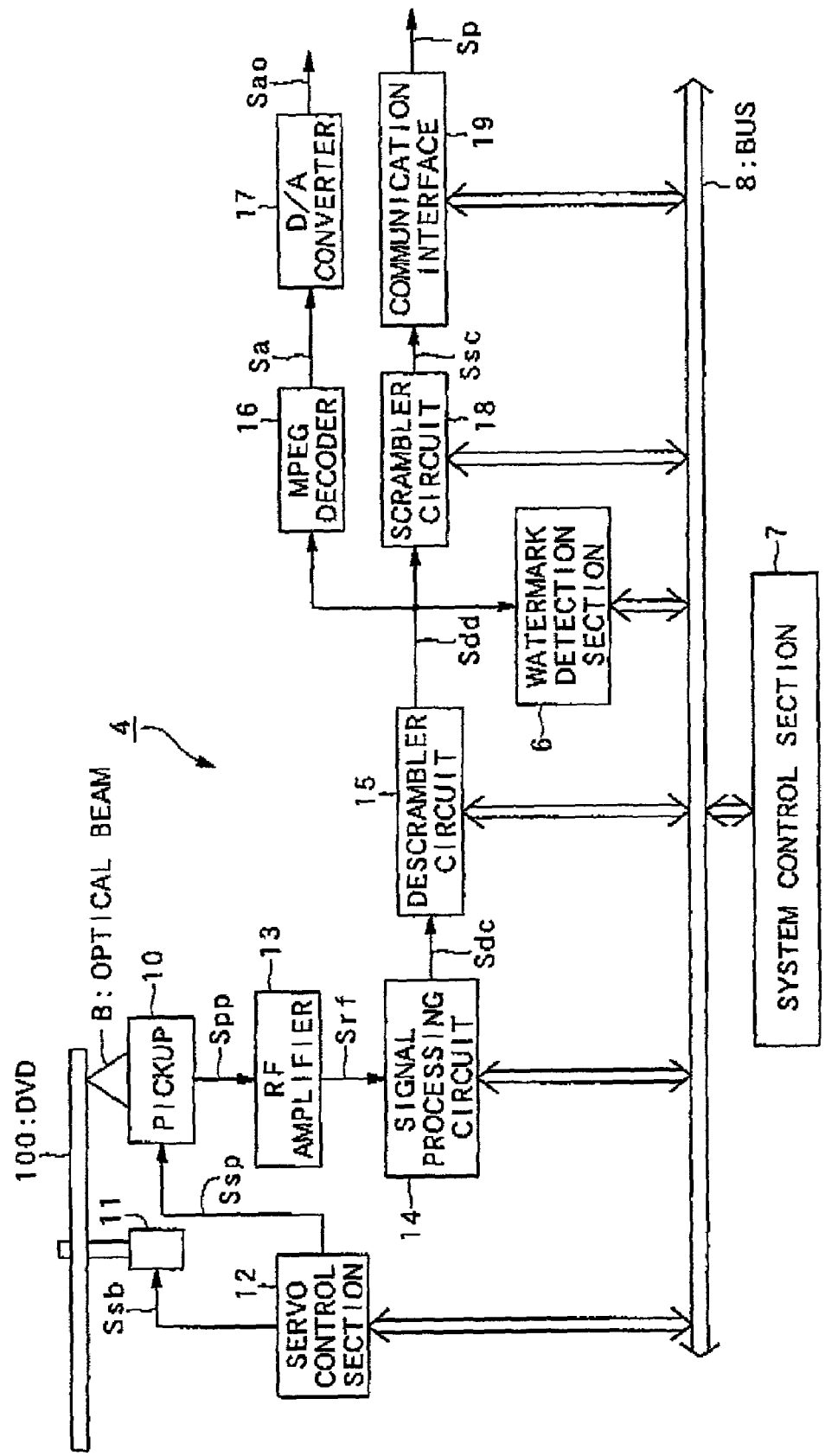
FIG. 4 is a block diagram showing the schematic structure of a player of the embodiment.

FIG. 4 is a block diagram showing the detailed structure of the DVD player 4.

As illustrated in FIG. 4, the DVD player 4 for reproducing the recording information from the reproducing-only DVD 100 having the recording information previously recorded and outputting the same information as the reproducing information Sp is comprised of a pickup 10, a spindle motor 11, a servo controller 12, an RF (Radio Frequency) amplifier 13, a signal processing circuit 14, a descrambler circuit 15, an MPEG (Moving Picture Expert Group) decoder 16, a D/A (Digital/Analog) converter 17, a scrambler circuit 18, a communication interface 19, a watermark detector 6, and a system controller 7. The servo controller 12, the signal processing circuit 14, the descrambler circuit 15, the scrambler circuit 18, the communication interface 19, the watermark detector 6, and the system controller 7 are connected to each other by a bus 8 so as to transmit and receive the control information and the like to and from each other.

The operation of the player 4 will be described this time.

The recording information to be reproduced is compressed by a compression method in conformity with the MPEG method and recorded in the DVD 100. Further, the recording information is encrypted by the predetermined encryption method, and recorded there. The copy control information (for example, what is called, CCI (Copy Control Information) information and the like) for preventing from illegal reproducing and illegal copy is embedded (multiplexed) in the same recording information as the watermark.

The DVD player 4 can reproduce the recording information and output it to a display or a speaker, not illustrated, as the analog information, as well as it can generate the reproducing information Sp and output it to the recorder 5.

When the recording information is reproduced from the DVD 100, the spindle motor 11 rotated according to the spindle control signal Ssb described later rotates the DVD 100 at the predetermined rotation speed, in the DVD player 4.

The pickup 10 irradiates the reproducing optical beam B of constant intensity on the rotating DVD 100, generates a detection signal Spp corresponding to the recording information recorded, by receiving the reflection light from the DVD 100, and outputs it to the RF amplifier 13.

At this time, a deviation between the condensing position of the optical beam B and the position on the information track where the recording information to be reproduced is recorded on the DVD 100 is dissolved by activating an actuator, not illustrated, for varying the position of an objective lens, not illustrated, for condensing the optical beam B on the information track, according to the pickup servo signal Ssp output from the servo control unit 12.

The RF amplifier 13 amplifies the detection signal Spp and outputs it to the signal processing circuit 14 as an RF signal Srf.

The signal processing circuit 14 performs the waveform shaping and the like processing on the RP signal Sfr under the control of the system controller 7 through the bus 8, generates a processing signal Sdc, and outputs it to the descrambler circuit 15.

The descrambler circuit decodes the encryption performed on the recording information included in the processing signal Sdc under the control of the system controller 7 through the bus 8, generates the decoding signal Sdd, and outputs it to the MPEG decoder 16, the scrambler circuit 18, and the watermark detector 6.

Thus, the watermark detector 6 detects the copy control information included in the decoding signal Sdd under the control of the system controller 7 through the bus 8 and outputs the content thereof to the system controller 7.

The system controller 7 controls the respective components so as to interrupt the reproducing processing of the recording information thereafter when the recording information within the DVD 100 proves to be illegally copied, according to the output content For example, the watermark detector having the structure disclosed in the paragraph number [0035] to [0053] and FIG. 3 in Japanese Patent Application Laid-Open No. 11-98341 is suitable as the detailed structure of the above-mentioned watermark detector 16.

The MPEG decoder 16 for outputting the decoding signal Sdd expands the recording information included in the decoding signal Sdd according to an expansion method corresponding to the above compression method performed on the decoding signal Sdd, generates an expansion signal Sa, and outputs it to the D/A converter 17.

The D/A converter 17 converts the expansion signal Sa into analog signal, generates an analog output signal Sao, and outputs it to the display and/or the speaker.

The scrambler circuit 18 for outputting the decoding signal Sdd encrypts the decoding signal Sdd by the encryption processing by use of the encryption key set in the communication interface 19 through mutual authentication with the recorder 5, under the control of the system controller 7 through the bus 8, generates an encryption signal Ssc, and outputs it to the communication interface 19. The method of the encryption processing in the scrambler circuit 18 is, hereinafter, referred to as the "B" method.

The communication interface 19 performs the predetermined output interface processing on the encryption signal Ssc, under the control of the system controller 7 through the bus 8, and outputs it to the recorder 5 as the demodulation information Sp.

In parallel with the operations of these components, the system controller 7 executes the prevention processing of the above-mentioned illegal reproducing and controls the overall operations of the components.

The detailed structure and operation of the recorder 5 will be described with reference to FIG. 5 and FIG. 6.

Figure 5:
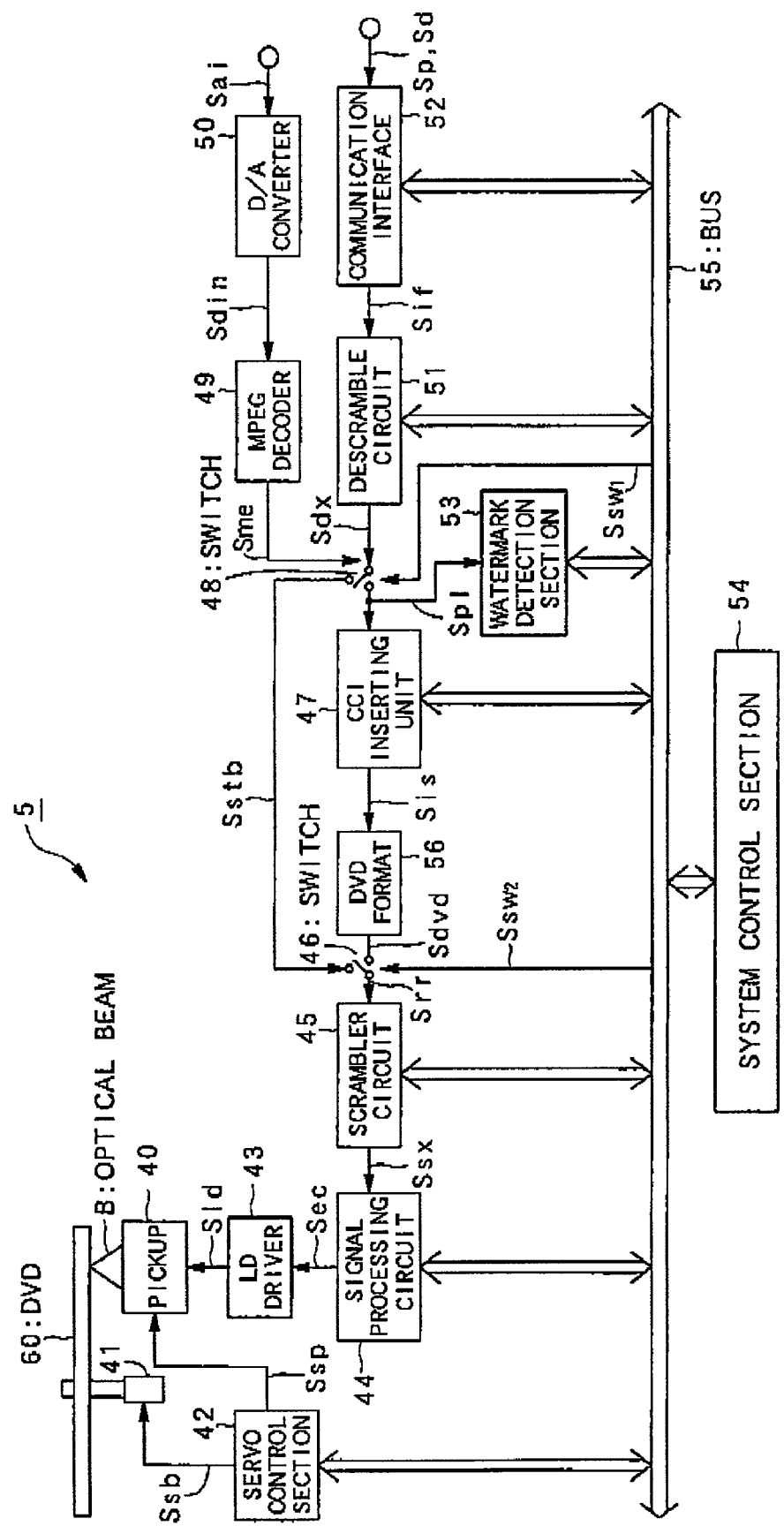
FIG. 5 is a block diagram showing the schematic structure of a recorder of the embodiment.
Figure 6:
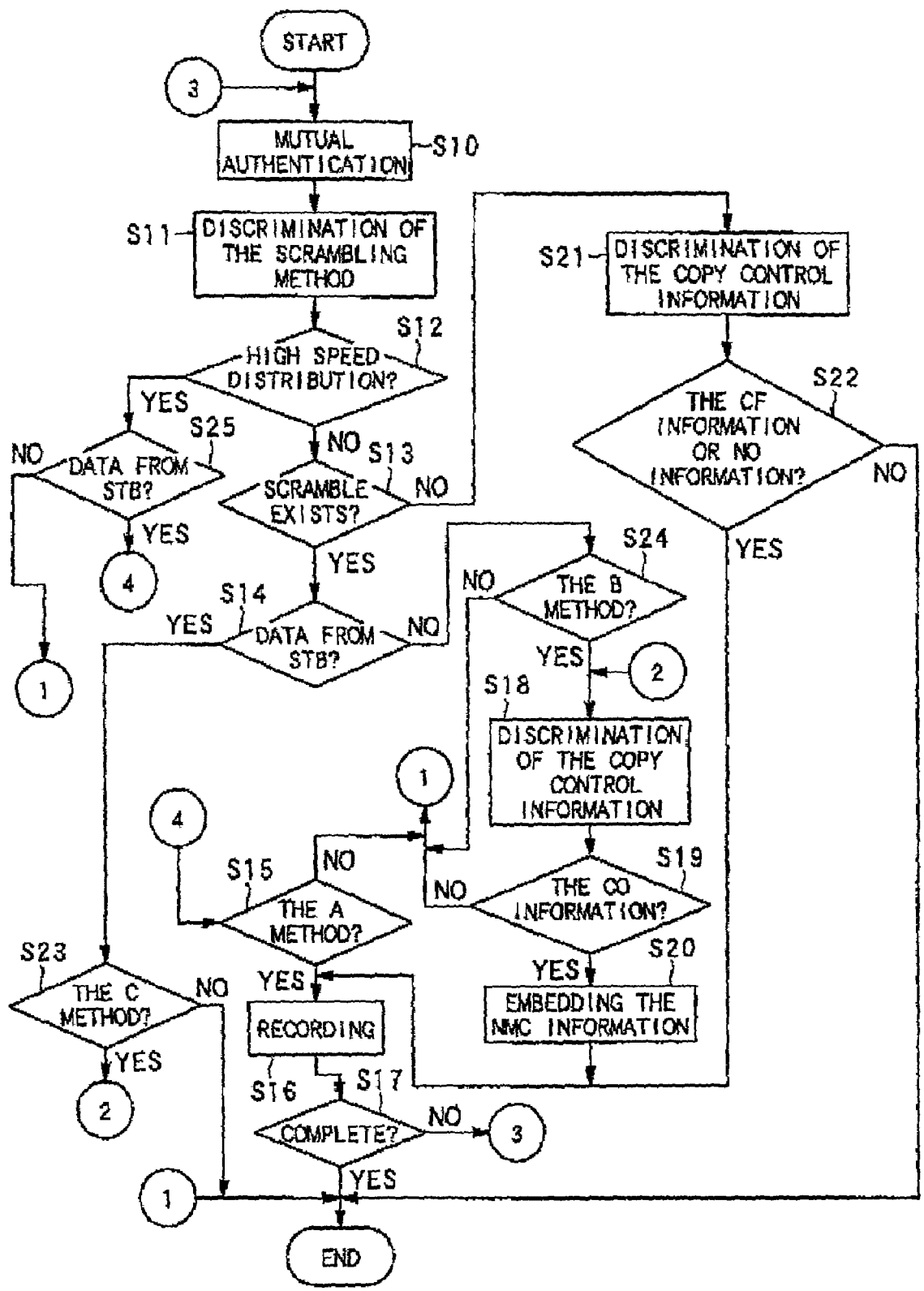
FIG. 6 is a flow chart showing the recording processing according to the embodiment.

FIG. 5 is a block diagram showing the detailed structure of the recorder 5, and FIG. 6 is a flow chart showing the detailed operation of the recorder 5.

As illustrated in FIG. 5, the recorder 5 for recording the recording information into the recordable DVD 60 is comprised of: a pickup 40 as a recording device; a spindle motor 41; a servo controller 42; an L/D (Laser Diode) driver 43; a signal processing circuit 44; a scrambler circuit 45; switches 46 and 48; a CCI inserting unit 47; an MPEG encoder 49; an A/ID (Analog/Digital) converter 50; a descrambler circuit 51; a communication interface 52 as an obtaining device; a watermark detector 53; a system controller 54 as a recognizing device, decision device, and recording control device; and a DVD formatter 56. The servo controller 42, the signal processing circuit 44, the scrambler circuit 45, the CCI inserting unit 47, the descrambler circuit 51, the communication interface 62, the watermark detector 53, and the system controller 54 are connected to each other through the bus 55 so as to transmit and receive the control information to and from each other.

The operation of the recorder 5 will be described this time.

The recording information to be recorded is compressed according to the compression method in conformity with the MPEG method and recorded into the DVD 60. Further, the recording information is encrypted according to the predetermined encryption method before compression and recorded there. The copy control information for preventing the illegal reproducing and illegal copy is embedded (multiplexed) in the recording information and recorded.

The recorder 5 can record the demodulation information Sd or the reproducing information Sp into the DVD 60 and further it can convert the analog information (including both the analog audio information and analog video information) from the outside into digital information and recode it into the DVD 60.

When recording the recording information into the DVD 60, the spindle motor 41 driven based on the spindle control Ssb described later rotates the DVD 60 at the predetermined rotation speed at first, in the recorder 5.

The A/D converter 50 converts the analog information Sai input from the outside into digital information, generates a digital input signal Sdin, and outputs it to the MPEG encoder 49.

The MPEG encoder 49 performs the compression processing in conformity with the MPEG method on the digital input signal Sdin, generates a compression signal Sme, and outputs it to the switch 48.

The communication interface 52 performs the predetermined input interface processing on the demodulation information Sd or the reproducing information Sp, and outputs it to the descrambler circuit 51 as processing information Sif, under a control of the system controller 54 through the bus 55.

The descrambler circuit 51 decodes the encryption processing performed on the recording information included in the processing information Sif, under the control of the system controller 54 through the bus 55, generates a decoding signal Sdx, and outputs it to the switch 48. Namely, the encryption processing is one of the "A" method when the processing information Sif corresponds to the demodulation information Sd delivered at a high speed, one of the "C" method when it corresponds to the demodulation information Sd delivered at an ordinary speed, and one of the "B" method when it corresponds to the reproducing information Sp.

Thus, when the decoding signal Sdx or the compression signal Sme corresponding to the reproducing information Sp or the demodulation information Sd distributed at the ordinal speed is output to the input terminal, according to a switch signal Ssw1 from the system controller 54, the switch 48 connects the CCI inserting unit 47 and the watermark detector 53 to output the decoding signal Sdx or the compression signal Sme corresponding to the reproducing information Sp to the CCI inserting unit 47 and the watermark detector 53 as a switch signal Spl. When the decoding signal Sdx corresponding to the demodulation information Sd distributed at a high speed is output to the input terminal, the switch 48 directly connects the switch 46 to output the decoding signal Sdx corresponding to the demodulation information Sd to the switch 46.

When the switch signal Spl includes the reproducing control signal, the watermark detector 53 detects the same signal, under the control of the system controller 54 through the bus 55, and outputs the content thereof to the system controller 54.

The system controller 54 controls the respective components so as to interrupt the recording processing of the analog information Sai or the reproducing information Sp thereafter, when the analog information Sai or the reproducing information Sp output to the recorder 5 as of now proves to be inhibited from the recording into the DVD 60, based on the output content.

The watermark detector having the structure disclosed in the paragraph number [0035] to [0053] and FIG. 3 in Japanese Patent Application Laid-Open No. 11-98341 is suitable as the detailed structure of the above-mentioned watermark detector 53.

The CCI inserting unit 47 inserts the copy control information corresponding to the content of the recording information having been recorded in the DVD 60, into the switch signal Spl, generates an insertion signal Sis, and outputs it to the DVD formatter 56.

More specifically, only when the copy control information in the switch signal Spl is the CO information, the CCI inserting unit 47 inserts the NMC information into the copy control information. When the copy control information in the switch signal Spl is the NC information or the NMC information, the recording processing itself is interrupted. The insertion of the NMC information is desirably performed by the other watermark embedding processing.

The DVD formatter 56 converts the insertion signal Sis into the recording format for DVD, generates a format signal Sdvd, and outputs it to the other input terminal of the switch 46.

When the decoding signal Sdx or the compression signal Sme corresponding to the reproducing information Sp or the demodulation information Sd distributed at the ordinal speed is output to the input terminal, according to a switch signal Ssw2 from the system controller 54, the switch 46 connects the CCI inserting unit 47 to output the format signal Sdvd corresponding to the reproducing information Sp to the scrambler circuit 45 as a switch signal Srr, and when the decoding signal Sdx corresponding to the demodulation information Sd distributed at a high speed is output to the input terminal, the switch 48 is switched to the upper portion in FIG. 5 to output the switch signal Sstb to the scrambler circuit 45 as a switch signal Srr.

The scrambler circuit 45 encrypts the recording information included in the switch signal Srr by using the predetermined encryption key, under the control of the system controller 54 through the bus 55, generates an encryption signal Ssx, and outputs it to the signal processing unit 44.

The signal processing circuit 44 performs the recording processing including the waveform shaping and the like on the encryption signal Ssx, under the control of the system controller 54 through the bus 55, generates a processing signal Sec, and outputs it to the LD driver 43.

The LD driver 43 amplifies the processing signal Sec, generates a driving signal Sld for driving a semiconductor laser (a semiconductor laser for irradiating the recording optical beam B on the DVD 60), not illustrated, within the pickup 40, and outputs it to the pickup 40.

Thus, the pickup 40 irradiates the recording optical beam B (whose intensity varies depending on the content of the recording information to be recorded) on the rotating DVD 60, and records the recording information at the corresponding position on the DVD 60.

At this time, a deviation between the condensing position of the optical beam B and the position on the information track where the recording information should be recorded on the DVD 60 can be dissolved by driving the actuator, not illustrated, for changing the position of the objective lens, not illustrated, for condensing the optical beam B on the information track, according to the pickup servo signal Ssp output from the servo controller 42 based on the control of the system controller 54 through the bus 55.

In parallel with the operations of these components, the system controller 54 executes the prevention processing of the illegal reproducing and controls the overall operations of the respective components through the bus 54.

The recording processing performed by the recorder 5 according to the embodiment will be described as a whole, with reference to FIG. 6.

The processing described later is the processing primarily performed by the system controller 54.

As illustrated in FIG. 6, in the recording processing in the recorder 5, when the recorder 5 is connected to the set top box 3 and the DVD player 4 through the communication interface 52, the mutual authentication as for the kind of each device is performed between the recorder 5 and the set top box 3, and between the recorder 5 and the DVD player 4 (Step S10), and the method of the encryption processing (namely, the "A" method, the "B" method, or the "C" method) in the recording information included in the output demodulation information Sd or the reproducing information Sp is determined according to the output demodulation information Sd or the reproducing information Sp (Step S11).

Then, it is determined whether or not the transfer speed of the demodulation information Sd is the speed at a time of high speed distribution (Step S12).

In the determination of Step S12, when the transfer speed is the speed at the time of high speed distribution (YES; Step S12), it is determined whether or not the recording information input to the recorder 5 as of now is the demodulation information Sd from the set top box 3 according to the result of the mutual authentication (Step S25).

When the recording information input to the recorder 5 is the demodulation information Sd (YES; Step S25), it is determined whether the encryption method is the above "A" method or not (Step S15).

When the encryption method of the demodulation information Sd is the above "A" method (YES; Step S15), the demodulation information Se is being distributed at a high speed, the copy control information multiplexed to the current distributed recording information is regarded as the first copy control information (more specifically, the NMC information or the CF information), and the recording processing into the DVD 60 is performed without changing the first copy control information (Step S16). At this time, the switches 46 and 48 in the recorder 5 are both switched to the switch signal Sstb (refer to FIG. 5).

In the recording processing in Step S16, the recorder 5 performs the descrambling processing corresponding to each encryption method and also performs the scrambling processing for the recording into the DVD on the switch signal Srr, except for the case where the copy control information is the CF information.

Then, it is determined whether or not the above-mentioned recording processing has been completed in all the recording information (Step S17). When it has not been completed (NO; Step S17), this step is returned to Step S10, where a series of the above-mentioned processing is performed on the recording information output next. When the recording processing has been completed in all the recording information (YES; Step S17), the processing is terminated.

On the other hand, in the determination of Step S12, when the input speed of the demodulation information Sd is not the same as the speed at a high speed distribution (NO; Step S12), it is determined whether the recording information is encrypted or not (Step S13). When it is encrypted (YES; Step S13), it is determined whether or not the recording information input to the recorder 5 as of now is the demodulation information Sd from the set top box 3 according to the result of the mutual authentication (Step S14).

When the recording information input to the recorder 5 is the demodulation information Sd (YES; Step S14), it is determined whether the encryption method of the demodulation information Sd is the "C" method or not (Step S23).

When the encryption method is the "C" method (YES; Step S23), the demodulation information Sd is being distributed at the ordinal speed, and accordingly, the copy control information multiplexed to the recording information being distributed now is regarded as the second copy control information (more specifically, the NC information or the CO information), and the content of the second copy control information is determined (Step S18 and Step S19). At this time, the switches 46 and 48 in the recorder 5 are both switched to the CCI inserting unit 47 and the watermark detector 53 (refer to FIG. 5).

When the content of the discriminated second copy control information is the CO information (YES; Step S19), since the corresponding recording information is permitted to be recorded into the DVD 60 only once, the recorder 5 starts the recording into the DVD 60 (Step S16) after inserting (overwriting or adding) the NMC information into the recording information by using the CCI inserting unit 57 (Step S20).

On the other hand, when the content of the discriminated second copy control information is not the CO information in the determination of Step S19 (NO; Step S19), it means that the input demodulation information Sd has been encrypted and the content of the second copy control information is not the CO information, which means that the content of the second copy control information is the NC information. Accordingly, the recording into the DVD 60 is prohibited and the recording processing is terminated.

When the encryption method is not the "C" method in the determination of Step S23 (NO; Step S23), it means that the demodulation information Sd should have been encrypted by the encryption processing of the "C" method. Therefore, the demodulation information Sd at that time may be the demodulation information Sd of unknown origin, and accordingly, the recording processing is terminated, without recording the demodulation information Sd into the DVD 60, for the sake of security.

When the encryption method in the demodulation information Sd is not the "A" method in the determination of Step S15 (NO; Step S15), it means that the demodulation information Sd should have been encrypted by the encryption processing of the "A" method. Therefore, the demodulation information Sd at that time may be the demodulation information Sd of unknown origin, and accordingly, the recording processing is terminated, without recording the demodulation information Sd into the DVD 60, for the sake of security.

When the recording information input to the recorder 5 is not the demodulation information Sd in the determination of Step S14 (NO; Step S14), it is determined whether or not the encryption method of the recording information is the "B" method (Step S24). When the encryption method is the "B" method (YES; Step S24), since the recording information can be decided to be the reproducing information Sp from the DVD player 4, this step is moved to Step S18 to Step S20 and Step S16 and Step S17, where the recording processing is performed according to the content of the copy control information included in the reproducing information Sp.

When the encryption method is not the B method in the determination of Step S24 (NO; Step S24), the reproducing information Sp may be the reproducing information Sp of unknown origin, similarly to the case of "NO" in the above Step S15 or "NO" in the above Step S23, and therefore the recording processing is terminated without recording it into the DVD 60.

When the input recording information is not encrypted in the determination of Step S13 (NO; Step S13), it means that the content of the copy control information as for the recording information is the CF information or that the copy control information itself is not embedded in the recording information. Therefore, the content of the copy control information included in the recording information is discriminated (Steps S21 and S22).

When the content of the copy control information is the CF information or the copy control information includes no data (YES; Step S22), it means that this step can be moved to the recording processing, and therefore this step is moved to the processing in Step S16 and the later.

When the content of the copy control information is the CF information or the copy control information includes some data (NO; Step S22), it means that copying is prohibited or restricted despite of not being encrypted, and the recording information at that time may be the reproducing information Sp or the demodulation information Sd of unknown origin. Therefore, the recording processing is terminated without recording the recording information into the DVD 60, for the sake of security.

When the recoding information input to the recorder 5 is not the demodulation information Sd in the determination of Step S25 (NO; Step S25), it means that the demodulation information at that time may be the demodulation information Sd of unknown origin, and the recording processing is terminated without recording the demodulation information Sd into the DVD 60, for the sake of security.

As mentioned above, according to the operation of the delivering and recording system of the embodiment, since the first copy control information and the recording information having the content after the recording into the DVD 60 are distributed at a high speed and the distributed recording information and first copy control information are recorded directly into the DVD 60 without changing the content of the first copy control information, the recording information can be distributed and recorded at a high speed.

When the first copy control information is the NMC information, the recording information after the recording into the DVD 60 can be distributed and recorded at a high speed in a way of prohibiting the copy from the DVD 60.

Since the recording information and the first copy control information are distributed to the recorder 5 through the CATV line IN, it is possible to distribute the recording information and the first copy control information assuredly at a high speed.

Since the recording information is converted into the DVD format and this is distributed at a high speed to be recorded into the DVD 60, it is not necessary to provide the recorder 5 with the DVD formatter having the speedy conversion performance and it is possible to play back the recorded DVD 60 by the ordinary DVD player.

(II) Modified Embodiment

This time, modified embodiments according to the present invention will be described with reference to FIG. 7 and FIG. 8.

Figure 7:
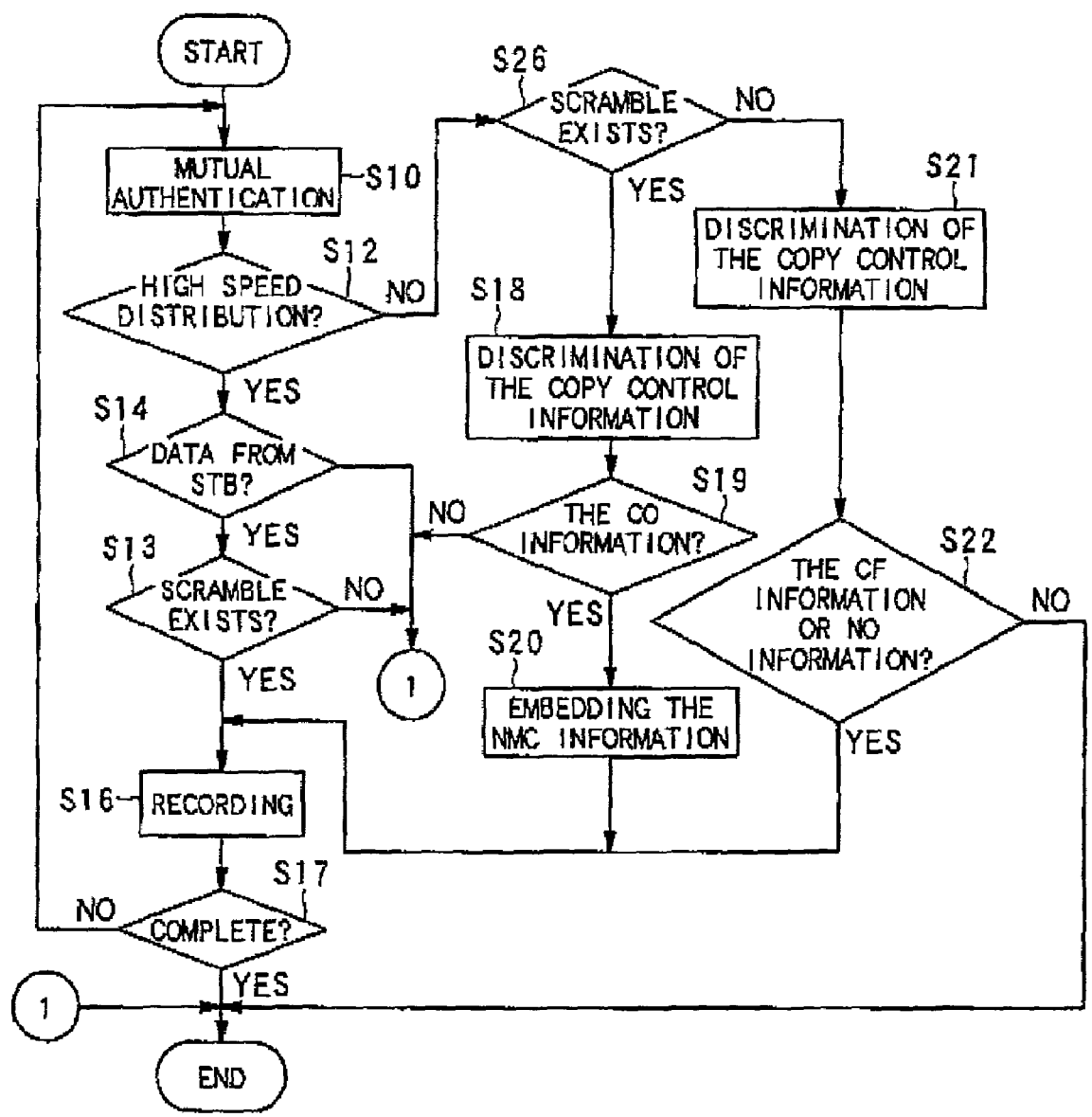
FIG. 7 is a flow chart showing the recording processing according to the first modification.
Figure 8:
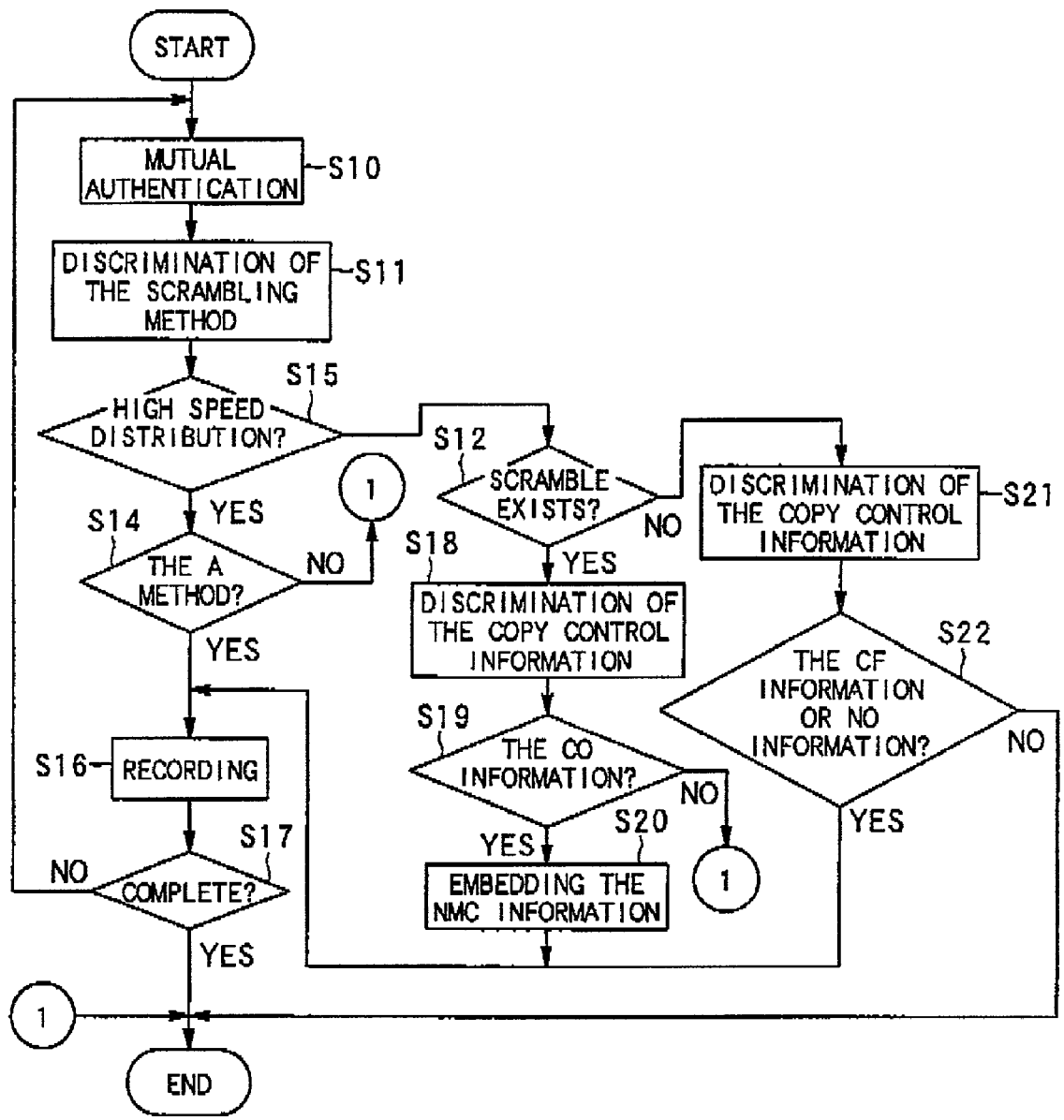
FIG. 8 is a flow chart showing the recording processing according to the second modification.

FIG. 7 is a flow chart showing the recording processing according to the first modified embodiment, and FIG. 8 is a flow chart showing the recording processing according to the second modified embodiment.

In FIG. 7, and FIG. 8, a detailed description of the same recording processing as shown in FIG. 6 is omitted here with the same step numbers attached there.

Further, a detailed description is omitted here since the processing other than the recording processing such as the distributing processing and the like, in each modified embodiment, is completely the same as in the above-mentioned embodiment.

The recording processing according to the first modified embodiment will be described with reference to FIG. 7.

In the recording processing according to the first modified embodiment shown in FIG. 7, the recording processing is executed on the assumption that an illegal set top box, or another illegal device or information reproducing device that pretends to be a normal set top box can be distinguished from the normal set top box completely through the mutual authentication in Step S10 in FIG. 6. This case does not perform a control based on a determination whether the encryption method is the "A" method, the "B" method, or the "C" method.

Namely, as illustrated in FIG. 7, in the recording processing according to the first modified embodiment, at first when the recorder 5 is connected to the set top box 3 and the DVD player 4, the mutual authentication as for the kind or type of the respective devices is executed between the recorder 5 and the set top box 3 and between the recorder 5 and the DVD player 4 (Step S10). Through the mutual authentication, it is determined whether or not the set top box connected to the recorder 5 as of now is the normal set top box 3, and if it is an illegal set top box, the connection is cut off.

Upon completion of the mutual authentication, it is determined whether or not the input speed is the speed at a time of high speed distribution from the transmitting unit 2 based on the demodulation information Sd (Step S12).

When the input speed of the demodulation information Sd is the same speed as at the high speed distribution (YES; Step S12), the demodulation information Se is being distributed at a high speed. Accordingly, the copy control information multiplexed to the recording information being distributed is regarded as the above-mentioned first copy control information, and it is determined whether or not the recording information input to the recorder 5 as of now is the demodulation information Sd from the set top box 3 based on the result of the mutual authentication (Step S14).

When the input recording information is the demodulation information Sd (YES; Step S14), the demodulation information Sd surely proves to be output from the normal set top box 3. Further, it is determined whether the recording information has been encrypted or not (Step S13). When it has been encrypted (YES; Step S13), the recording processing into the DVD 60 is performed without changing the first copy control information (Step S16).

Then, it is determined whether the above-mentioned recording processing has been completed or not as for all the recording information (Step S17). When it has not been completed (NO; Step S17), this step is returned to the above Step S10, where a series of the above processing is performed on the next recording information. When the recording processing has been completed as for all the recording information (YES; Step S17), the processing is terminated.

When the input speed of the demodulation information Sd is not the same speed as at the high speed distribution and the same speed as the normal reproducing speed of the recording information in the determination of Step S12 (NO; Step S12), it means that the demodulation information Se is being distributed at the normal speed now, and it is determined whether the recording information has been encrypted or not (Step S26). When it has been encrypted (YES; Step S26), it means that the recording information input to the recorder 5 as of now is included in the reproducing information Sp or the demodulation information Sd input at the normal speed, and that the copy control information multiplexed to the recording information input as of now is the above-mentioned second copy control information, and the content of the second copy control information is determined (Steps S18 and S19).

When the content of the discriminated second copy control information proves to be the CO information (YES, Step S19), it means that the corresponding recording information is permitted to be recorded into the DVD 60 only once, and therefore the CO information is rewritten into the NMC information by using the CCI inserting unit 57 (Step S20), hence to start the recording into the DVD 60 (Step S16).

On the other hand, when the content of the discriminated second copy control information proves not to be the CO information in the determination of Step S19 (NO; Step S19), it means that the input demodulation information Sd or the reproducing information Sp has been encrypted and that the content of the second copy control information is the NC information or the NMC information because it is not the CO information, and accordingly the recording into the DVD 60 is prohibited, thereby finishing the recording processing.

When the recording information has not been encrypted in the determination of the above Step S26 (NO; Step S26), it means that the recording information is the CF information or that there exists no copy control information itself, and the content of the copy control information included there is discriminated (Step S21 and Step S22).

When the content of the copy control information is the CF information or it includes no data (YES; Step S22), it means that this step may be moved to the recording processing, and therefore, this step is moved to the processing of the above Step S16 and the later.

When the content of the copy control information is not the CF information (NO; Step S22), it means that the copy is prohibited despite of not being encrypted. Since the recording information at that time may be the reproducing information Sp or the demodulation information Sd of unknown origin, the recording processing is terminated, without recording the same recording information into the DVD 60 for the sake of security.

When the input recording information is not the demodulation information Sd in the determination of the above Step S14 (NO; Step S14), or when the recording information has not been encrypted in the determination of the above Step S13 (NO; Step S13), since it means that the demodulation information Sd at that time may be the demodulation information Sd of unknown origin, the recording processing is terminated, without recording the same demodulation information Sd into the DVD 60 for the sake of security.

The recording processing according to the second modification will be described with reference to FIG. 8.

The recording processing according to the second modified embodiment shown in FIG. 2 is different from the above embodiment and the first modified embodiment in that the method of the encryption processing in the case of high speed distribution is defined as the "A" method, and that the method of the encryption processing in the case of normal speed distribution and the encryption processing method of the DVD player 4 are defined as the "B" method, in the distributing processing of the recording information by the distributing server 1 and the transmitting unit 2. Further, according to the second modified embodiment, the set top box 3 and the DVD player are not distinguished especially in the mutual authentication.

As illustrated in FIG. 8, in the recording processing according to the second modified embodiment, at first, when the recorder 5 is connected to the set top box 3 and the DVD player 4, the mutual authentication is performed as for the type of the respective devices between the recorder 5 and the set top box 3 and between the recorder 5 and the DVD player 4 (Step S10), and further the method of the encryption processing (namely, the "A2" method or the "B" method) in the recording information included in the input demodulation information Sd or the reproducing information Sp is determined according to the input demodulation information Sd (or the reproducing information Sp) (Step S11).

When the encryption method is determined, it is determined whether or not the input speed of the recording information into the recorder 5 is the speed at the high speed distribution from the transmitting unit 2 (Step S15).

When the input speed of the recording information is the same as the speed at the high speed distribution (YES; Step S15), it is determined whether the encryption method of the demodulation signal Sd is the "A" method or not (Step S14). When the encryption method of the demodulation signal Sd is the "A" method (YES; Step S14), it means that the modulation information Se is being distributed at a high speed through the set top box 3 and that the copy control information multiplexed to the recording information under distribution is the first copy control information, thereby performing the recording processing into the DVD 60 without changing the first copy control information (Step S16).

It is determined whether or not the above-mentioned recording processing has been completed as for all the recording information (Step S17). When it has not been completed (NO; Step S17), this step is returned to the above Step S10, where a series of the above processing is performed on the recording information input next. When the recording processing has been completed as for all the recording information (YES; Step S17), the processing is terminated.

When the encryption method in the recording information is not the "A" method in the determination of Step S14 (NO; Step S14), it means that the information should have been encrypted by the encryption processing of the "A" method so as to be distributed at a high speed, but that it is not encrypted. Therefore, since the demodulation information Sd at that time may be the demodulation information Sd of unknown origin, the recording processing is terminated, without recording the demodulation information Sd into the DVD 60 for the sake of security.

When the input speed of the recording information is not the same as the speed at the high speed distribution but the same as the normal reproducing speed of the recording information (NO; Step S15) in the determination of Step S15, it is determined whether the recording information has been encrypted or not (Step S12). When it has been encrypted (YES; Step S12), it means that the recording information input to the recorder 5 as of now is included in the reproducing information Sp or the demodulation information Sd input at the normal speed and that the copy control information multiplexed to the recording information input now is the second copy control information, and the content of the second copy control information is discriminated (Steps S18 and S19).

When the content of the discriminated second copy control information proves to be the CO information (YES; Step S19), the corresponding recording information is permitted to be recorded into the DVD 60 only once, thereby starting the recording into the DVD 60 (Step S16) after updating the CO information, namely overwriting the CO information with the NMC information or adding the NMC information to the CO information (Step S20) by using the CCI inserting unit 57.

When the content of the discriminated second copy control information proves not to be the CO information in the determination of Step S19 (NO; Step S19), it means that the input demodulation information Sd or the reproducing information Sp has been encrypted and that the content of the second copy control information can be the NC information or the NMC information because it is not the CO information. Therefore, the recording into the DVD 60 is prohibited and accordingly the recording processing is terminated.

When the input recording information has not been encrypted in the determination of the Step S12 (No; Step S12), the content of the copy control information included in the same information is determined (Steps S21 and S22).

When the content of the copy control information proves to be the CF information or to have no data (YES; Step S22), it means that the recording processing can be continued, and therefore, this step is moved to the processing of Step S16 and the later.

When the content of the copy control information is not the CF information (NO; Step S22), it means that the copy is prohibited in spite of performing no encryption, and the demodulation signal Sd or the reproducing signal Sp at that time may be the recording information of unknown origin. Therefore, the recording processing is terminated, without recording the recording information into the DVD 60 for the sake of security.

As described above, the recording processing of the respective modified embodiments can obtain the same effect as the recording processing of the above-mentioned embodiment.

Although the embodiment and the modified embodiments have been described in the case of distributing the modulation information Se through the CATV line IN, it may be designed to distribute the information by using one or some of a ground wave digital line, a satellite communication line, the Internet, and the like.

Although the embodiment and the modified embodiments have been described when the number of times the copy of the recording information is permitted after recording into the DVD 60 is zero (corresponding to the NMC information) or infinite (corresponding to the CF information), it may be designed to distribute the information with twice copy permission information attached thereto, which permission information permits twice copying into the DVD 60 and the other storing medium after the distribution (the twice copy permission information is rewritten into the one copy permission information (CO information) at a time of the recording into the DVD 60).

In this case, at the high speed distribution of the recording information, the copy is permitted only once after the recording into the DVD 60, and at the normal speed distribution, the copy is permitted only once after the recording into the DVVD 60, by rewriting the copy control s information into the one copy permission information at a recording time into the DVD 60.

Further, with a program corresponding to the flow charts shown in FIG. 2, and FIGS. 6 to 8 recorded into a hard disk or an information recording medium such as a flexible disk and the like, the program is read out by a personal computer or the like, hence to work the personal computer as the system controller and the like.

Although the above embodiment has been described in the case of performing the mutual authentication between the apparatus, separately from the discrimination of the formatting method, the mutual authentication and the discrimination of the formatting method can be performed at once.

Further, the discrimination of the high speed distribution can be performed simultaneously with the determination of the scrambling method.

Instead of the discrimination of the scrambling method itself, the scrambling method may be discriminated by deciding whether or not the descrambling processing can be performed on the processing information Sif according to the descrambling method in conformity with the descrambler circuit 15.

In the recording processing according to the embodiment shown in FIG. 6, the discrimination whether the scrambling method is the "B" method and whether it is the "C" method can be omitted.

Further, in the recording processing according to the first modified embodiment shown in FIG. 7, the scrambling method may be classified into the "A", "B", and "C" methods, and it may be only one type of scrambling method without any classification.

In the recording processing according to the second modification show in FIG. 8, the scrambling method other than the "A" method may be classified into the "B" method and the "C" method, and alternatively, it may be only one type of scrambling method, except for the "A" method.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-320347 filed on Oct. 20, 2000 including the specification, claims, drawings and summary is incorporated herein by reference in its entirety.

What is claimed is:

1. An information output apparatus for outputting recording information and copy control information to an information recording apparatus which records the recording information and copy control information into a recording medium, the information output apparatus comprising:

a generating device for generating copy control information indicating a number of times the recording information can be recorded;

a multiplexing device for multiplexing the copy control information, which is generated by the generating device, and the recording information;

an output device for outputting the multiplexed information to the information recording apparatus; and a determining device for determining whether an instruction for a high-speed distribution is issued, wherein the recording information is distributed at a higher speed than the reproducing speed;

wherein, the generating device generates a sign that indicates no more copies are allowed as the copy control information if it is determined that the instructions for high-speed distribution is issued; and wherein the sign that indicates no more copies is generated at the information output apparatus before being transmitted to the recording apparatus, such that the information recording apparatus records the recording information and the copy control information as modified by the information output apparatus into the recording medium without further modifying the copy control information.

2. The information output apparatus according to claim 1, wherein
the output device outputs the multiplexed recording information and copy control information to the information recording apparatus through an at least one electric communication line.

3. The information output apparatus according to claim 2, wherein
the at least one electric communication line is any of the Internet line, a ground wave digital line, a satellite communication line, and a cable television line.

4. The information output apparatus according to claim 1, wherein
the output device further comprises a converting device for converting the multiplexed recording information and copy control information into a recording information and a copy control information in conformity with a recording format used for recording the information into the recording medium in the information recording apparatus, and for outputting the converted information to the information recording apparatus, when outputting the multiplexed recording information and copy control information to the information recording apparatus at the output speed.

5. The information output apparatus according to claim 1, further comprising:
an encryption method changing device for changing an encryption method on the basis of outputted information speed.

6. An information recording apparatus for recording copy control information and recording information into a recording medium, said copy control information and recording information output from an information output apparatus, the information output apparatus comprising:
a generating device for generating copy control information indicating a number of times the recording information can be recorded;
a multiplexing device for multiplexing the copy control information, which is generated by the generating device, and the recording information;
an output device for outputting the multiplexed information to the information recording apparatus; and
a determining device for determining whether an instruction for a high-speed distribution is issued, wherein the recording information is distributed at a higher speed than the reproducing speed;
wherein the generating device generates a sign that indicates no more copies are allowed as the copy control information if it is determined that the instructions for high-speed distribution is issued; and
wherein the sign that indicates no more copies is generated at the information output apparatus before being transmitted to the recording apparatus,
said information recording apparatus comprising:
an obtaining device for obtaining the output recording information and copy control information;
a recording device for recording the obtained recording information and copy control information into the recording medium, without further modifying the copy control information;
and a recording control device for controlling the recording device so as to record the recording information and copy control information into the recording medium, only when the recording information and copy control information has been output from the obtaining device at the higher speed, according to the determination result in the determination device.

7. The information recording apparatus according to claim 6, further comprising:
an encryption method detecting device for detecting encryption method of inputted information; and
a switching device for switching the inputted information on the basis of the detected encryption method.

8. An information output recording system comprising an information output apparatus for outputting recording information and copy control information, and an information recording apparatus, wherein said information output apparatus comprises:
a generating device for generating copy control information indicating a number of times the recording information can be recorded;
a multiplexing device for multiplexing the copy control information, which is generated by the generating device, and the recording information;
an output device for outputting the multiplexed information to the information recording apparatus; and
a determining device for determining whether an instruction for a high-speed distribution is issued, wherein the recording information is distributed at a higher speed than the reproducing speed;
wherein the generating device generates a sign that indicates no more copies are allowed as the copy control information if it is determined that the instructions for high-speed distribution is issued; and
wherein the sign that indicates no more copies is generated at the information output apparatus before being transmitted to the recording apparatus,
said information recording apparatus comprising:
an obtaining device for obtaining the output recording information and the copy control information; and
a recording device for recording the obtained recording information and copy control information as modified by the information output apparatus into the recording medium, without further modifying the obtained copy control information.

9. The information output recording system according to claim 8, wherein said information recording apparatus comprises:
a recognizing device for mutually recognizing a type of device between the obtaining device and the information recording apparatus; and
a recording control device for controlling the recording device so as to record the recording information and copy control information into the recording medium, only when recognizing that the recording information and the copy control information has been output at the higher output speed from the obtaining device, based on the recognition result in the recognizing device.

10. The information output recording system according to claim 8, wherein
the obtaining device outputs the obtained recording information and copy control information to the information recording apparatus at an output speed, after performing encryption processing corresponding to only the output speed.

11. The information output recording system according to claim 10, wherein
said information recording apparatus comprises:
a determination device for determining whether or not the recording information and copy control information has been output from the obtaining device, according to the encryption processing in the output recording information and copy control information, and a recording control device for controlling the recording device so as to record the recording information and copy control information into the recording medium, only when it finds that the recording information and copy control information have been output from the obtaining device at the higher speed, according to the determination result in the determination device.

12. The information output recording system according to claim 10, wherein
said information recording apparatus further comprises:
a decoding device for decoding the output recording information and the copy control information; and
a recording encryption device for recording the decoded output recording information and copy control information into the recording medium, after performing the encryption processing for recording on information.

13. The information output recording system according to claim 8, wherein
the output device outputs the multiplexed recording information and copy control information to the obtaining device through an at least one electric communication line.

14. The information output recording system according to claim 13, wherein
the at least one electric communication line is any of the Internet line, a ground wave digital line, a satellite communication line, and a cable television line.

15. An information output method for outputting recording information and copy control information to an information recording apparatus which records the recording information and copy control information into a recording medium, the information output method comprising:
generating copy control information, by a generating device, comprising first copy control information indicating a number of times which the recording information can be recorded;
multiplexing the copy control information, by a multiplexing device, which is generated, and the recording information;
outputting the multiplexed information, by an outputting device, to the information recording apparatus; and
determining whether an instruction for a high-speed distribution is issued, by a determining device, wherein the recording information is distributed at a higher speed than the reproducing speed;
wherein the generating the copy control information comprises generating a sign that indicates no more copies are allowed as the copy control information if it is determined that the instructions for high-speed distribution is issued; and
wherein the sign that indicates no more copies is generated at the information output apparatus before being transmitted to the recording apparatus, such that the information recording apparatus records the recording information and the copy control information as modified by the information output method into the recording medium without further modifying the copy control information.

16. The information output method according to claim 15, further comprising converting the multiplexed recording information and copy control information into a recording information and copy control information in conformity with a recording format used for recording the information into the recording medium in the information recording apparatus, to output the converted information to the information recording apparatus, when outputting the multiplexed recording information and copy control information to the information recording apparatus at an output speed.

17. An information output recording method comprising an information output method for outputting recording information and copy control information and an information recording method, wherein said information output method comprises:
generating copy control information, by a generating device, comprising first copy control information indicating a number of times the recording information can be recorded;
multiplexing the copy control information, by a multiplexing device, which is generated, and the recording information;
outputting the multiplexed information, by an outputting device, to the information recording apparatus; and
determining whether an instruction for a high-speed distribution is issued, by a determining device, wherein the recording information is distributed at a higher speed than the reproducing speed;
wherein the generating the copy control information comprises generating a sign that indicates no more copies are allowed as the copy control information if it is determined that the instructions for high-speed distribution is issued; and
wherein the sign that indicates no more copies is generated at the information output apparatus before being transmitted to the recording apparatus, and
said information recording method comprises:
obtaining, by an obtaining device, the output recording information and copy control information; and
recording, by a recording device, the obtained recording information and copy control information as modified by the information output method into the recording medium, without further modifying the copy control information.

18. The information output recording method according to claim 17, wherein
said information recording method further comprises mutually recognizing a type of device between the obtaining device for executing the obtaining method and the information recording apparatus, and
in the recording process, the recording information and the copy control information are recorded into the recording medium, only when it is recognized that the recording information and the copy control information have been output at the higher output speed from the obtaining device, based on the recognized type in the recognizing process.

19. The information output recording method according to claim 17, wherein
in the obtaining process, the obtained recording information and copy control information are output to the information recording apparatus at an output speed, after performing encryption processing corresponding to only the output speed.

20. The information output recording method according to claim 19, wherein
said information recording method comprises
determining whether or not the recording information and the copy control information have been output from the obtaining device, according to the encryption processing in the output recording information and copy control information, and
in the recording process, the recording information and the copy control information are recorded into the recording medium, only when recognizing that the recording information and copy control information have been output from the obtaining device at the higher speed, according to the decision result in the determining process.

21. The information output recording method according to claim 19, wherein
said information recording method further comprises:
decoding the output recording information and copy control information; and
recording the decoded recording information and copy control information into the recording medium, after performing an encryption processing for recording on information.

22. An information recording medium in which an output control program recorded in a readable way by an output control computer included in an information output apparatus for outputting recording information and copy control information to an information recording apparatus which records the recording information and copy control information into a recording medium, wherein the output control program stored on the information recording medium causes the output control computer to function as:
a generating device for generating copy control information comprising first copy control information indicating a number of times the recording information can be recorded;
a multiplexing device for multiplexing the copy control information, which is generated by the generating device, and the recording information;
an output device for outputting the multiplexed information to the information recording apparatus; and
a determining device for determining whether an instruction for a high-speed distribution is issued where the recording information is distributed at a higher speed than the reproducing speed;
wherein, the generating device generates a sign that indicates no more copies are allowed as the copy control information if it is determined that the instructions for high-speed distribution is issued; and
wherein the sign that indicates no more copies is generated at the information output apparatus before being transmitted to the recording apparatus, such that the information recording apparatus records the recording information and the copy control information as modified by the information output apparatus into the recording medium without further modifying the copy control information.

23. The information recording medium according to claim 22, wherein
the output control program causes the output control computer to further function as a converting device for converting the multiplexed recording information and copy control information into a recording information and copy control information in conformity with a recording format used for recording the information into the recording medium in the information recording apparatus, to output the converted information to the information recording apparatus, when outputting the multiplexed recording information and copy control information to the information recording apparatus at the output speed.

24. An information recording medium in which a recording control program recorded in a readable medium by a recording control computer included in an information recording apparatus which records copy control information and recording information into a recording medium,
said recording control program causes the recording control computer to function as:
an obtaining device for obtaining the recording information and the copy control information;
a recording device for recording the obtained recording information and copy control information into the recording medium, without further modifying the copy control information; and
a recording control device for controlling the recording device so as to record the recording information and copy control information into the recording medium, only when the recording information and copy control information has been output from the obtaining device at a speed higher than the reproducing speed,
wherein said copy control information and recording information are output from an information output apparatus for outputting the recording information and the copy control information to the information recording apparatus,
said information output apparatus comprises:
a generating device for generating the copy control information comprising first copy control information indicating a number of times which the recording information can be recorded;
a multiplexing device for multiplexing the copy control information, which is generated by the generating device, and the recording information;
an output device for outputting the multiplexed information to the information recording apparatus; and
a determining device for determining whether an instruction for a high-speed distribution is issued where the recording information is distributed at a higher speed than the reproducing speed;
wherein, the generating device generates a sign that indicates no more copies are allowed as the copy control information if it is determined that the instructions for high-speed distribution is issued; and
wherein the sign that indicates no more copies is generated at the information output apparatus before being transmitted to the recording apparatus, such that the information recording apparatus records the recording information and the copy control information into the recording medium without further modifying the copy control information.

25. An information output apparatus for outputting recording information and copy control information to an information recording apparatus which records the recording information and copy control information into a recording medium, the information output apparatus comprising:
a determining device for determining whether an outputting speed is higher than a reproducing speed of the recording information from the recording medium;
a generating device for generating first copy control information indicating a number of times which the recording information can be recorded after being recorded into the recording medium if it is determined that the outputting speed is higher than the reproducing speed, and for generating second copy control information indicating a number of times which the recording information can be recorded before being recorded into the recording medium if it is determined that the outputting speed is not higher than the reproducing speed;
a multiplexing device for multiplexing the first or second copy control information, which is generated by the generating device, and the recording information; and
an outputting device for outputting the multiplexed information to the information recording apparatus,
wherein the first copy information is generated at the information output apparatus before being transmitted to the recording apparatus, such that the information recording apparatus receives the first copy control information as modified by the information output apparatus and records the recording information and the first copy control information into the recording medium without further modifying the first copy control information.

* * * * *